United States Patent [19]

Dannheim et al.

[11] Patent Number: 5,334,709
[45] Date of Patent: Aug. 2, 1994

[54] REACTIVE DYESTUFFS CONTAINING A TRIAZINYLAMINO GROUP AND ONE OR TWO GROUPS OF THE VINYLSULFONE SERIES

[75] Inventors: Jörg Dannheim, Frankfurt am Main; Werner H. Russ, Flörsheim am Main, both of Fed. Rep. of Germany

[73] Assignee: Hoechst AG, Frankfurt, Fed. Rep. of Germany

[21] Appl. No.: 993,360

[22] Filed: Dec. 18, 1992

[30] Foreign Application Priority Data

Dec. 20, 1991 [DE] Fed. Rep. of Germany ....... 4142420
Feb. 21, 1992 [DE] Fed. Rep. of Germany ....... 4205326
Dec. 15, 1992 [DE] Fed. Rep. of Germany ....... 4204599

[51] Int. Cl.$^5$ .................... C09B 62/503; D06P 1/384
[52] U.S. Cl. .................................. 534/618; 534/617; 534/629; 534/641; 534/642; 540/126; 544/76; 544/193.1; 544/189; 544/206; 544/207
[58] Field of Search ............... 534/617, 618, 629, 641, 534/803; 540/126; 544/76, 193.1, 189, 206, 207

[56] References Cited

U.S. PATENT DOCUMENTS 4,775,746 10/1988 Springer et al. ................ 534/617 X

FOREIGN PATENT DOCUMENTS 0282443 9/1988 European Pat. Off. .
3327713 2/1985 Fed. Rep. of Germany ...... 534/617

Primary Examiner—Mary C. Lee
Assistant Examiner—Fiona T. Powers
Attorney, Agent, or Firm—Connolly & Hutz

[57] ABSTRACT

Fiber-reactive dyestuffs, such as, for example, azo dyestuffs and heavy metal complex derivatives thereof, anthraquinone dyestuffs, phthalocyanine dyestuffs and formazan dyestuffs, which contain a fiber-reactive group of the vinylsulfone series and furthermore a group of the general formula

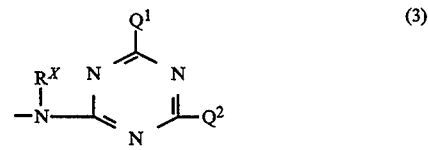

in which $R^x$ is hydrogen or lower alkyl, which can be substituted by substituents customary in dyestuffs, and $Q^1$ and $Q^2$ both independently of one another are each lower alkyl, which is substituted by 1 or 2 lower alkanoyl groups or 1 or 2 lower alkoxycarbonyl groups or by one such alkoxycarbonyl and alkanoyl group, or an amino group, which is substituted by optionally substituted aryl and/or alkyl radicals, or an optionally substituted alkoxy, aryloxy, alkylthio or arylthio radical or a cyanamido radical, are described. The novel dyestuffs dye material containing hydroxy and/or carboxamide groups, such as cellulose fiber materials, wool and polyamides, in deep shades, and moreover are suitable for discharge and resist printing.

12 Claims, No Drawings

REACTIVE DYESTUFFS CONTAINING A TRIAZINYLAMINO GROUP AND ONE OR TWO GROUPS OF THE VINYLSULFONE SERIES

DESCRIPTION

Water-soluble fiber-reactive dyestuffs, processes for their preparation and their use.

The invention relates to the technical field of fiber-reactive dyestuffs.

The practice of dyeing using reactive dyestuffs has recently led to heightened requirements in the quality of the dyeings and the economics of the dyeing process. Consequently, there continues to be a demand for novel fiber-reactive dyestuffs which have improved properties, especially from use technology aspects. Dyestuffs which can be discharged perfectly white and colored in a high quality and are thus particularly suitable both for discharge printing and for resist printing furthermore are increasingly required. Triazine-containing dyestuffs have to date been regarded as being non-dischargeable, since after discharging, fragments of dyestuff remain, which have led to a brownish-yellow discoloration of the textiles.

Novel, useful fiber-reactive dyestuffs of the formula (1) given and defined below, which have very good use technology properties and moreover are particularly suitable for discharge and resist printing, for which reason they can be employed in a relatively broad field of use for dyeing fiber materials, have now been found with the present invention. In discharge printing, a discharge agent is printed onto a colored web of material (ground) in a desired pattern; the discharge agent destroys the dyestuff, if this is dischargeable, so that after the discharge process has been completed, a white pattern appears on the dyeing (white discharge). If the printed-on discharge additionally contains a discharge-stable dyestuff, a printed pattern in a different color shade (colored discharge) is obtained after completion of the discharge operation and customary treatment for fixing this added dyestuff on the ground.

In resist printing, the fabric is first printed with a suitable resist agent in a desired pattern. The fabric preprinted in this way is then cross-dyed (overpadded or overprinted) with a dyestuff which is able to bond to the resist agent and is therefore no longer capable of fixing to the fabric, with the result that no fixing of the dyestuff occurs on the resist printed areas and the resulting dyeing thus has a white pattern according to the pattern of the resist agent.

The novel dyestuffs according to the invention have the formula (1)

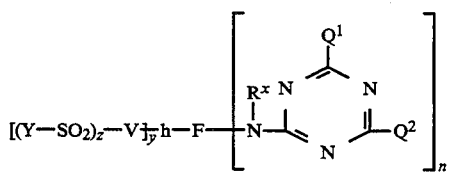

in which:

F is the radical of a monoazo, disazo or polyazo dyestuff, or of a heavy metal complex azo dyestuff derived therefrom, or of an anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbimide dyestuff;

$R^x$ is a hydrogen atom or an alkyl group having 1 to 4 carbon atoms, such as the methyl or ethyl group, which can be substituted by halogen, such as chlorine and bromine, hydroxy, cyano, alkoxy having 1 to 4 carbon atoms, such as methoxy and ethoxy, alkoxycarbonyl having 2 to 5 carbon atoms, carboxy, sulfamoyl, sulfo or sulfato, preferably the methyl or ethyl group, and in particular a hydrogen atom;

n is the number 1 or 2, preferably 1;

V is a direct bond or an alkylene group, or is an optionally substituted arylene radical or an alkylene-arylene or arylene-alkylene or alkylene-arylene-alkylene or arylene-alkylene-arylene radical, or an arylene-arylene radical which is interrupted by a hetero group, such as, for example, one of those mentioned below, and the alkylene radicals of those groups have 1 to 8 carbon atoms, preferably 2 to 6, in particular 2 to 4 carbon atoms, and can be substituted, for example by sulfo, carboxy, sulfato and/or phosphato, and the arylene radicals are optionally substituted phenylene or naphthylene radicals, and the alkylene radicals can be interrupted by one or more, such as two or three, hetero groups, such as —NH—, —N(R)—, where R is alkyl having 1 to 4 carbon atoms, which can be substituted by sulfo, carboxy, sulfato, phenyl or sulfophenyl, —O—, —S—, —SO$_2$—, —CO—, —SO$_2$—NH—, —NH—SO$_2$—, —NH—CO— and —CO—NH—, and the alkylene and arylene portions in the combined alkylene-/arylene radicals in each case can be separated from one another by a hetero group, such as, for example, one of those mentioned above;

y is the number 1 or 2;

z is the number 1 or 2;

h is an N atom, if y is 2, or, if y is 1, is a group of the formula —NH—, —N(R)—, where R has one of the abovementioned meanings, —NH—CO—NH—, —NH—CO— or —CO—NH—, or preferably a direct bond;

Y is the vinyl group or is an ethyl group, which contains, in the β-position, a substituent which can be eliminated under alkaline conditions, such as the β-sulfatoethyl, β-thiosulfatoethyl or β-phosphatoethyl group or a β-alkanoyloxy-ethyl group having 2 to 5 carbon atoms in the alkanoyl radical, such as the β-acetoxyethyl group, or the β-benzoyloxy-ethyl, β-(sulfobenzoyloxy)-ethyl or β-(p-toluenesulfonyloxy)-ethyl group or a β-halogenoethyl group, such as the β-bromoethyl or β-chloroethyl group, and is preferably the vinyl group and in particular the β-sulfatoethyl group, and the group(s) —SO$_2$—Y can be bonded to an aromatic carbon atom of F or V directly or via an alkylene radical having 1 to 4 carbon atoms, such as the methylene group, or via an alkylamino group having 1 to 4 carbon atoms, such as the methylamino or ethylamino group;

$Q^1$ and $Q^2$ are both, with meanings which are identical to one another or different from one another, each alkyl having 1 to 4 carbon atoms, in particular methyl, which is substituted by 1 or 2 alkanoyl groups having 2 to 5 carbon atoms, such as acetyl, or by 1 or 2 alkoxycarbonyl groups having 2 to 5 carbon atoms, such as methoxycarbonyl or ethoxycarbonyl, or by one of these alkoxycarbonyl and one of these alkanoyl groups, or are a group of the formula (2a), (2b), (2c) or (2d)

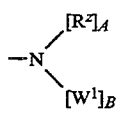 (2a)

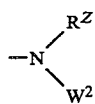 (2b)

—O—R$^A$ (2c)

—S—R$^C$ (2d)

in which

R$^z$ is a hydrogen atom or an alkyl group having 1 to 6 carbon atoms, preferably 1 to 4 carbon atoms, such as, in particular, the methyl or ethyl group, which can be substituted by 1 or 2 substituents from the group comprising halogen, such as chlorine or bromine, hydroxy, cyano, alkoxy having 1 to 4 carbon atoms, such as methoxy and ethoxy, carboxy, carbalkoxy having 2 to 5 carbon atoms, phenoxycarbonyl, alkanoyl having 2 to 5 carbon atoms, benzoyl, sulfobenzoyl, sulfamoyl, sulfo and sulfato, and/or by a phenyl radical which is optionally substituted by substituents from the group comprising halogen, such as chlorine and bromine, alkoxy having 1 to 4 carbon atoms, such as methoxy and ethoxy, alkyl having 1 to 4 carbon atoms, such as methyl, sulfo and carboxyl, or is a cycloalkyl radical having 5 to 8 carbon atoms, such as a cyclopentyl, cyclohexyl or dimethylcyclohexyl radical, or is a phenyl radical which is optionally substituted by substituents from the group comprising halogen, such as chlorine and bromine, alkoxy having 1 to 4 carbon atoms, such as methoxy and ethoxy, alkyl having 1 to 4 carbon atoms, such as methyl, sulfo and carboxy, W$^1$ is an alkyl, aryl, alkylene-aryl, arylene-alkyl, alkylene-arylene-alkyl or arylene-alkylene-aryl radical, in which the alkylene radicals and alkyl radicals are those having 1 to 8 carbon atoms, preferably 2 to 6, in particular 2 to 4 carbon atoms, and can be substituted by substituents which are not fiber-reactive, and the arylene radicals and aryl radicals are phenyl or naphthylene radicals or, respectively, phenyl or naphthyl radicals which are optionally substituted by substituents which are not fiber-reactive, and in which the alkylene radicals can be interrupted by one or more, such as 2 or 3, hetero groups, such as —NH—, —N(R)—, where R is alkyl having 1 to 4 carbon atoms, which can be substituted by sulfo, carboxy, sulfato, phenyl or sulfophenyl, —O—, —S—, —SO$_2$—, —CO—, —SO$_2$—NH—, —NH—CO— and —CO—NH—, and the alkylene and arylene portions or, respectively, alkyl and aryl portions in the combined alkyl(ene)/aryl(ene) radicals in each case can be separated from one another by a hetero group, such as, for example, one of those described above, or the radicals —[R$^z$]$_A$ and —[W$^1$]$_B$, together with the nitrogen atom, form a heterocyclic radical which is built up from an alkylene radical having 3 to 8 carbon atoms, preferably 4 to 6 carbon atoms, or a heterocyclic radical which is built up from a further hereto group, such as a nitrogen atom, an oxygen atom or a group —NH—, and two alkylene radicals having 1 to 4 carbon atoms, such as, for example, the N-piperazino, N-piperidino or N-morpholino radical, A is the number zero or 1 and B is the number 1 or 2, in which the sum of (A+B) is the number 2 and in which, if B is 2, the groups W$^1$ have the same meaning as one another or can have different meanings to one another, W$^2$ is cyano, or is a group of the formula (2e), (2f) or (2g)

 (2e)

—O—R$^K$ (2f)

 (2g)

in which

R$^K$ is a hydrogen atom or an alkyl group having 1 to 4 carbon atoms, such as the ethyl or methyl group, or an alkyl group having 1 to 4 carbon atoms, which is substituted by sulfo, carboxy, phosphato, sulfato, hydroxy, cyano, alkoxy having 1 to 4 carbon atoms, such as methoxy and ethoxy, phenyl or phenyl which is substituted by substituents from the group comprising sulfo, carboxy, alkyl having 1 to 4 carbon atoms, alkoxy having 1 to 4 carbon atoms, chlorine and nitro, or is a cycloalkyl radical having 5 to 8 carbon atoms, such as the cyclopentyl, cyclohexyl or dimethylcyclohexyl radical, R$^L$ is hydrogen, alkyl having 1 to 4 carbon atoms, such as ethyl and methyl, or alkyl having 1 to 4 carbon atoms, which is substituted by sulfo, carboxy, phosphato, sulfato, hydroxy, cyano, alkoxy having 1 to 4 carbon atoms, such as methoxy and ethoxy, phenyl or phenyl which is substituted by substituents from the group comprising sulfo, carboxy, alkyl having 1 to 4 carbon atoms, alkoxy having 1 to 4 carbon atoms, chlorine and nitro, or is phenyl, which can be substituted by 1, 2 or 3 substituents from the group comprising alkyl having 1 to 4 carbon atoms, such as ethyl and, in particular, methyl, alkoxy having 1 to 4 carbon atoms, such as ethoxy and, in particular, methoxy, chlorine, sulfo, carboxy and nitro, or R$^K$ and R$^L$, together with the nitrogen atom, form a heterocyclic radical which is built up from an alkylene radical having 3 to 8 carbon atoms, preferably 4 to 6 carbon atoms, or a heterocyclic radical which is built up from a further hetero group, such as a nitrogen atom, an oxygen atom or a group —NH—, and two alkylene radicals having 1 to 4 carbon atoms, such as, for example, the N-piperazino, N-piperidino or N-morpholino radical, or R$^Z$ and W$^2$, together with the nitrogen atom, form a heterocyclic radical which is built up from an alkylene radical having 3 to 8 carbon atoms, preferably 4 to 6 carbon atoms, or a heterocyclic radical which is built up from a further hetero group, such as a nitrogen atom, an oxygen atom or a group —NH—, and two alkylene radicals having 1 to 4 carbon atoms, such as, for example, the N-piperazino, N-piperidino or N-morpholino radical, R$^A$ is hydrogen or alkyl having 1 to 4 carbon atoms, such as methyl and ethyl, which can be substituted by halogen, such as chlorine or bromine, nitro, alkanoyl having 2 to 4 carbon atoms, hydroxy, cyano, alkoxy having 1 to 4 carbon atoms, such as methoxy and ethoxy, sulfo, sulfato, carboxy, phenyl or sulfo-substituted phenyl, or is alkenyl having 3 to 5 carbon atoms or alkinyl having 3 to 5 carbon atoms, or is cycloalkyl having 5 to 8 carbon atoms, such as cyclohexyl, or is phenyl, naphthyl, phenyl which is substituted by 1 or 2 substituents from the group comprising alkyl having 1 to 4 carbon atoms, alkoxy having 1 to 4 carbon atoms, sulfo and carboxy, or naphthyl which is substituted by 1, 2 or 3 sulfo groups, or cyano, and $R^C$ is hydrogen, alkyl having 1 to 4 carbon atoms, such as methyl and ethyl, which can be substituted by halogen, such as chlorine or bromine, hydroxy, alkanoyloxy having 2 to 5 carbon atoms, such as acetoxy, cyano, alkoxy having 1 to 4 carbon atoms, such as methoxy and ethoxy, carboxy, sulfo, sulfato, phenyl or phenyl which is substituted by 1 or 2 substituents from the group comprising alkyl having 1 to 4 carbon atoms, alkoxy having 1 to 4 carbon atoms, sulfo and carboxy, or is alkenyl having 3 to 5 carbon atoms or alkinyl having 3 to 5 carbon atoms, or is phenyl, which can be substituted by methyl, ethyl, methoxy, ethoxy, amino, nitro, carboxy and/or sulfo, or is cyano; or $Q^1$ and $Q^2$ are both, with meanings which are identical to one another or different from one another, in each case one group of the formula (2A)

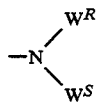
(2A)

in which $W^R$ is a hydrogen atom or an alkyl group having 1 to 4 carbon atoms, such as the ethyl or methyl group, or an alkyl group having 1 to 4 carbon atoms, which is substituted by sulfo, carboxy, phosphato, sulfato, hydroxy, cyano, alkoxy having 1 to 4 carbon atoms, such as methoxy and ethoxy, phenyl or phenyl which is substituted by substituents from the group comprising sulfo, carboxy, alkyl having 1 to 4 carbon atoms, alkoxy having 1 to 4 carbon atoms, chlorine and nitro, or is a cycloalkyl radical having 5 to 8 carbon atoms, such as the cyclopentyl, cyclohexyl or dimethylcyclohexyl radical, $W^S$ is hydrogen, alkyl having 1 to 4 carbon atoms, such as methyl and ethyl, or alkyl having 1 to 4 carbon atoms, which is substituted by sulfo, carboxy, phosphato, sulfato, hydroxyl, cyano, alkoxy having 1 to 4 carbon atoms, such as methoxy and ethoxy, phenyl or phenyl which is substituted by substituents from the group comprising sulfo, carboxy, alkyl having 1 to 4 carbon atoms, alkoxy having 1 to 4 carbon atoms, chlorine and nitro, or is phenyl, which can be substituted by 1, 2 or 3 substituents from the group comprising alkyl having 1 to 4 carbon atoms, such as ethyl and, in particular, methyl, alkoxy having 1 to 4 carbon atoms, such as ethoxy and, in particular, methoxy, chlorine, sulfo, carboxy and nitro, or $W^R$ and $W^S$, together with the nitrogen atom, form a heterocyclic radical which is built up from an alkylene radical having 3 to 8 carbon atoms, preferably 4 to 6 carbon atoms, or a heterocyclic radical which is built up from a further hetero group, such as a nitrogen atom, an oxygen atom or a group —NH—, and two alkylene radicals having 1 to 4 carbon atoms, such as, for example, the N-piperazino, N-piperidino or N-morpholino radical;

excluding dyestuffs of the formula (1) in which $Q^1$ is the cyanamido group and $Q^2$ at the same time is an aryl, alkylene-aryl, arylene-alkyl, alkylene-arylene-alkyl or arylene-alkylene-aryl radical which is substituted by one or more solubilizing substituents and which optionally also contains other substituents and/or can be interrupted by hetero groups, or is a cyanamide radical, or $Q^2$ is the cyanamido group and $Q^1$ at the same time is an aryl, alkylene-aryl, arylene-alkyl, alkylene-arylene-alkyl or arylene-alkylene-aryl radical which is substituted by one or more solubilizing substituents and which optionally also contains other substituents and/or can be interrupted by hetero groups, or is a cyanamido radical.

Preferably, F is the radical of a monoazo or disazo dyestuff or the radical of a metal complex azo dyestuff, such as of an o,o'-1:1 copper complex monoazo or disazo dyestuff, or of a triphendioxazine, an anthraquinone or a phthalocyanine dyestuff, such as of a copper phthalocyanine dyestuff.

The radical F can contain the substituents customary in organic dyestuffs in its basic structure. Such substituents are, for example: alkyl groups having 1 to 4 carbon atoms, such as methyl, ethyl, propyl, isopropyl or butyl, and of these preferably ethyl and in particular methyl; alkoxygroups having 1 to 4 carbon atoms, such as methoxy, ethoxy, propoxy, isopropoxy and butoxy, and of these preferably ethoxy and in particular methoxy; acylamino groups having 2 to 8 carbon atoms, such as the acetylamino, propionylamino or benzoylamino groups; primary and mono- or disubstituted amino groups, in which the substituents are, for example, alkyl groups having 1 to 4 carbon atoms and/or phenyl groups, such as monoalkylamino and dialkylamino groups having 1 to 4 carbon atoms in the alkyl radical, phenylamino or N-($C_1$-$C_4$-alkyl)-N-phenylamino groups, in which the alkyl radicals can also be substituted, for example by phenyl, sulfophenyl, hydroxy, sulfato, sulfo and carboxy, and the phenyl groups can also be substituted, such as by chlorine, sulfo, carboxy, methyl and/or methoxy, thus, for example, methylamino, ethylamino, propylamino, isopropylamino, butylamino, N,N-di-($\beta$-hydroxyethyl)amino, N,N-di-($\beta$-sulfatoethyl)amino, sulfobenzylamino, N,N-di-(sulfobenzyl)amino and diethylamino groups, as well as phenylamino and sulfophenylamino groups; alkoxycarbonyl groups having an alkyl radical having 1 to 4 carbon atoms, such as methoxycarbonyl and ethoxycarbonyl; alkylsulfonyl groups having 1 to 4 carbon atoms, such as methylsulfonyl and ethylsulfonyl; trifluoromethyl, nitro and cyano groups; halogen atoms, such as fluorine, chlorine and bromine; carbamoyl groups, which can be mono- and disubstituted by alkyl having 1 to 4 carbon atoms, in which the alkyl radicals in turn can be substituted, for example by hydroxy, sulfato, sulfo, carboxy, phenyl and sulfophenyl, such as, for example, N-methyl-carbamoyl and N-ethyl-carbamoyl; sulfamoyl groups, which can be mono- or disubstituted by alkyl groups having 1 to 4 carbon atoms, and N-phenyl-N-alkyl-sulfamoyl groups with an alkyl group having 1 to 4 carbon atoms, in which these alkyl groups in turn can be substituted by hydroxy, sulfato, sulfo, carboxy, phenyl and sulfophenyl, such as, for example, N-methyl-sulfamoyl, N-ethyl-sulfamoyl, N-propyl-sulfamoyl, N-isopropyl-sulfamoyl, N-butyl-sulfamoyl, N-($\beta$-hydroxyethyl)-sulfamoyl and N,N-di-($\beta$-hydroxyethyl)-sulfamoyl; and N-phenylsulfamoyl, ureido, hydroxy, carboxy, sulfomethyl and sulfo groups.

Preferably, the dyestuff radical F is substituted by one or more, such as 2 to 6, sulfo groups; further substituents, where appropriate, are preferably those from the group comprising methyl, ethyl, methoxy, ethoxy, alkanoylamino having 2 to 5 carbon atoms, such as acetylamino, benzoylamino, amino, chlorine, bromine, ureido, hydroxy, carboxy and sulfomethyl.

Solubilizing groups are, for example, the carboxy, sulfo, sulfato, phosphato, phosphono and phosphino group.

In all the formulae, the individual formula members, both of different and of the same designation within a general formula, can have meanings which, in the context of their definition, are identical to one another or different from one another.

The groups "sulfo", "carboxy", "phosphato", "phosphono", "phosphino", "thiosulfato" and "sulfato" include both the acid form thereof and the salt thereof. Accordingly, sulfo groups are groups corresponding to the formula —$SO_3M$, carboxy groups are groups corresponding to the formula —COOM, phosphato groups are groups corresponding to the formula —$OPO_3M_2$, phosphono groups are groups corresponding to the formula —$OPO_2M_2$, phosphino groups are groups corresponding to the formula —$PO_2M_2$, thiosulfato groups are groups corresponding to the formula —S—$SO_3M$ and sulfato groups are groups corresponding to the formula —$OSO_3M$,
in which M is a hydrogen atom or a salt-forming metal atom, such as an alkali metal, such as sodium, potassium or lithium.

Formula radicals $R^x$ are, for example: hydrogen, methyl, ethyl, propyl, isopropyl, butyl, isobutyl, sec-butyl, tert-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl, γ-bromopropyl, β-hydroxyethyl, β-hydroxybutyl, β-cyanoethyl, sulfomethyl, β-sulfoethyl, amidosulfonylmethyl and β-sulfatoethyl.

Formula radicals $R^Z$ are, for example: hydrogen, methyl, ethyl, carboxymethyl, carbomethoxymethyl, carbethoxymethyl, sulfomethyl, sulfamidomethyl, β-carboxyethyl, β-sulfatoethyl, n-propyl, β-carboxypropyl, β-sulfatoethyl, β-ethoxyethyl, β-methoxypropyl, γ-chloropropyl, γ-bromopropyl, n-butyl, isobutyl, cyclohexyl, phenyl, 2-chlorophenyl, 3-chlorophenyl, 4-chlorophenyl, 2- or 3- or 4-sulfophenyl, 2-methyl-phenyl, 4-methoxy-phenyl, 3-methyl-phenyl and 4-ethyl-phenyl. Of these, the optionally substituted alkyl groups are preferred, and the methyl and the ethyl group and the hydrogen atom are particularly preferred.

In the radicals V and W, arylene radicals and aryl radicals are preferably phenylene and naphthylene radicals or, respectively, phenyl and naphthyl radicals, which can contain one or more, such as 2 or 3, preferably 1 or 2 substituents which, for example, belong to the group of substituents comprising alkyl having 1 to 4 carbon atoms, such as methyl and ethyl, halogen, such as fluorine, chlorine and bromine, hydroxy, cyano, alkoxy having 1 to 4 carbon atoms, such as methoxy and ethoxy, sulfamoyl, trifluoromethyl and alkoxycarbonyl having 2 to carbon atoms, such as methoxycarbonyl and ethoxycarbonyl, and, if necessary, the group of solubilizing substituents. Of these, W is preferably a phenylene or phenyl radical, which can be substituted by the abovementioned substituents, the substituents from the group comprising alkyl having 1 to 4 carbon atoms, chlorine, alkoxy having 1 to 4 carbon atoms, carboxy and sulfo being preferred.

Alkyl and alkylene radicals in the radical W are preferably straight-chain or branched alkyl or alkylene groups having 2 to 6 carbon atoms, which can be interrupted by the hereto groups mentioned, such as 1 or 2 of these hetero groups, and if necessary can be substituted by one or more solubilizing groups. Of these, straight-chain alkyl or alkylene groups having 2 to 4 carbon atoms or an alkyl or alkylene group having 4 carbon atoms which is interrupted by an oxygen atom or an amino or methylamino group are preferred. Particularly preferred alkyl radicals are ethyl or n-propyl groups which are substituted by sulfo, carboxy, sulfato or phosphato. Substituents in the alkylene group of W can be, for example, sulfo, carboxy, hydroxy and cyano groups.

If the formula radical W is an alkylene-aryl or an alkylene-arylene-alkyl radical, the alkyl or alkylene radical in these groups is preferably a straight-chain radical having 1 to 3 carbon atoms and the arylene radical in these groups is preferably a 1,3- or, in particular, 1,4-phenylene radical, which are substituted, if necessary, by one or more solubilizing groups. Alkylene-arylene radicals and alkylene-aryl radicals are, in particular, the radicals of the formulae —$CH_2$—$CH_2$-phenylene- and —$CH_2$-phenylene-, or the phenethyl and benzyl groups, which are substituted in the phenyl radical by sulfo and/or carboxy.

Radicals of the formula (2) are, for example: amino, methylamino, ethylamino, propylamino, (β-methoxyethyl)amino, phenylamino, benzylamino, dimethylamino, diethylamino, N-morpholino, N-piperazino, N-piperidino, hydrazino, hydroxylamino, cyanamido, ureido, bis-(β-hydroxyethyl)-amino,bis-(β-sulfatoethyl)-amino,2-sulfo-ethylamino, N-methyl-2-sulfo-ethylamino, 2-hydroxyethylamino, 2-sulfo-phenylamino, 3-sulfo-phenylamino, 4-sulfo-phenylamino, 2-carboxy-phenylamino, 3-carboxy-phenylamino, 4-carboxy-phenylamino, 3,5-disulfo-phenylamino, 2-methyl-5-sulfo-phenylamino, 2-methyl-4-sulfophenylamino, 2,4-disulfo-phenylamino, 3,4-dicarboxy-phenylamino, 2,5-dicarboxy-phenylamino, 3,5-dicarboxy-phenylamino, 2-carboxy-ethylamino, 4-carboxy-butylamino, 1-carboxy-2-methyl-n-propyl-1-amino, 1-carboxy-3-methyl-n-butyl-1-amino, 1-carboxy-ethyl-1-amino, hydroxyl, methoxy, ethoxy, propoxy, butoxy, iso-propoxy, tert.-butoxy, 2-methoxy-ethoxy, phenoxy, cyanato, 2-carboxy-ethoxy, 3-carboxy-propoxy, 4-methyl-phenoxy, 3-methyl-phenoxy, 2-methyl-phenoxy, 2-sulfo-ethoxy, 2-sulfato-ethoxy, cyclohexyloxy, benzyloxy, naphth-2-yl-oxy, 1-acetyl-eth-1-oxy, prop-2-en-1-yl-oxy, prop-2-in-1-yl-oxy, 1,3-dicarboxy-prop-2-yl-oxy, β-nitro-ethoxy, thiol, methylthio, ethylthio, phenylthio, 2-carboxy-ethylthio, prop-2-en-1-yl-thio, 2-amino-phenylthio, benzylthio, n-propylthio, 2,4-dimethyl-phenylthio, 2-acetyloxy-ethylthio, 2-hydroxy-ethylthio, carboxymethylthio, 1,3-dicarboxy-prop-2-yl-oxy, 2-ethoxy-ethylthio, 4-nitro-phenylthio, 2-carboxy-phenylthio, methoxycarbonyl-methyl, ethoxycarbonyl-methyl, acetyl-methyl, 1-acetyl-1-ethoxycarbonyl-methyl and diacetyl-methyl.

The formula radical V is preferably a direct bond. If V is an arylene radical it is preferably an optionally sulfo-substituted naphthylene radical or a phenylene radical, which can be substituted by 1 or 2 substituents from the group comprising alkyl having 1 to 4 carbon atoms, alkoxy having 1 to 4 carbon atoms, halogen, such as chlorine and bromine, alkylsulfonyl having 1 to 4 carbon atoms, sulfo, carboxy and trifluoromethyl.

If V is an alkylene radical, this is preferably an alkylene radical having 2 to 6 carbon atoms, which can optionally be interrupted by one or more of the abovementioned hetero groups and substituted by one or more of the substituents mentioned.

Preferred radicals —V—h— are: 1,4-phenylene, 1,3-phenylene, 1,4-phenylene-amino, 1,3-phenylene-amino, 2-methyl-5-methoxy-1,4-phenylene-4-amino, 4-chloro-1,3-phenylene-3-amino, 4-hydroxy-1,3-phenylene-3-amino, 4-methoxy-1,3-phenylene-3-amino, 2,5-dimethoxy-1,4-phenylene-4-amino, 4-carboxy-1,3-phenylene-3-amino and radicals of the formulae

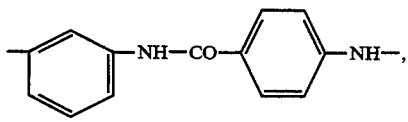

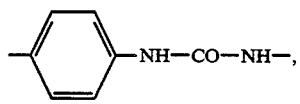

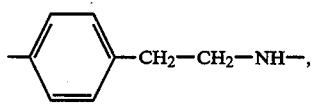

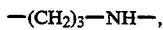

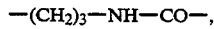

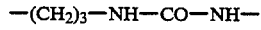

and

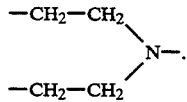

Dyestuffs in which y is 1 and V and h are both a direct bond are also particularly preferred.

The grouping of the formula (3)

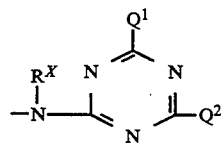

bonded to the dyestuff radical F is preferably a radical of the formula (3a) or (3b)

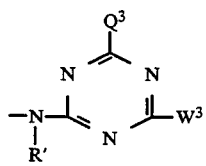

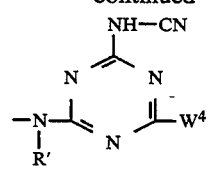

in which

R' is methyl or ethyl or, preferably, hydrogen, $Q^3$ is alkoxy having 1 to 4 carbon atoms, such as methoxy and ethoxy, or is an amino group of the formula —$NT^1T^2$, in which $T^1$ is hydrogen or alkyl having 1 to 4 carbon atoms, which can be substituted by hydroxy, alkoxy having 1 to 4 carbon atoms, such as ethoxy and methoxy, sulfo, carboxy, sulfato, phosphato, phenyl and sulfo-substituted phenyl, and $T^2$ is hydrogen or alkyl having 1 to 4 carbon atoms, which can be substituted by hydroxy, alkoxy having 1 to 4 carbon atoms, such as methoxy and ethoxy, sulfo, carboxy, sulfato, phosphato, phenyl and sulfo-substituted phenyl, or is phenyl, which can be substituted by 1 or 2 substituents from the group comprising alkoxy having 1 to 4 carbon atoms, such as methoxy and ethoxy, alkyl having 1 to 4 carbon atoms, such as methyl and ethyl, sulfo and carboxy, $W^3$ is an amino group of the formula —$NT^3T^4$ in which $T^3$ is hydrogen or alkyl having 1 to 4 carbon atoms, which can be substituted by hydroxy, alkoxy having 1 to 4 carbon atoms, such as ethoxy and methoxy, sulfo, carboxy, sulfato, phosphato, phenyl and sulfo-substituted phenyl, and $T^4$ is hydrogen or alkyl having 1 to 4 carbon atoms, which can be substituted by hydroxy, alkoxy having 1 to 4 carbon atoms, such as ethoxy and methoxy, sulfo, carboxy, sulfato, phosphato, phenyl and sulfo-substituted phenyl, or is phenyl, which can be substituted by 1 or 2 substituents from the group comprising alkoxy having 1 to 4 carbon atoms, such as methoxy and ethoxy, alkyl having 1 to 4 carbon atoms, such as methyl and ethyl, sulfo and carboxy, and $W^4$ is alkoxy having 1 to 4 carbon atoms, such as ethoxy and methoxy, or an amino group of the formula —$NT^5T^6$ in which $T^5$ is hydrogen, alkyl having 1 to 4 carbon atoms, such as ethyl and methyl, which can be substituted by phenyl, hydroxy or alkoxy having 1 to 4 carbon atoms, such as methoxy and ethoxy, or is cyclohexyl, and $T^6$ is hydrogen, alkyl having 1 to 4 carbon atoms, which can be substituted by phenyl, hydroxy or alkoxy having 1 to 4 carbon atoms, such as ethoxy and methoxy, or is phenyl, which can be substituted by 1 or 2 substituents from the group comprising methoxy, ethoxy, methyl and ethyl.

Important azo dyestuffs corresponding to the formula (1) are those in which F is a radical of a dyestuff of the benzene-azo-naphthol, the benzene-azo-1-phenyl-5-pyrazolone, the benzene-azo-benzene, the naphthalene-azo-benzene, the benzene-azo-aminonaphthalene, the naphthalene-azo-naphthalene, the naphthalene-azo-1-phenyl-5-pyrazolone, the benzene-azo-pyridone and the naphthalene-azo-pyridone series, the dyestuffs containing sulfo groups also being preferred here.

Of the 1:1 copper complex azo dyestuffs according to the invention, those of the benzene and naphthalene series are preferred.

Preferred mono- and disazo dyestuffs of the formula (1) are, for example, those of the formulae (4a) and (4b)

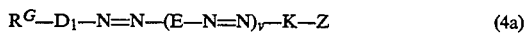

(4a)

(4b)

and the heavy metal complex compounds derived therefrom, such as 1:1 copper complex compounds, in which $D_1$ is the radical of a diazo component of the benzene or naphthalene series, $D_2$ is the radical of a diazo component of the diaminobenzene or diaminonaphthalene series, E is the radical of a middle component of the benzene or naphthalene series, K is the radical of a coupling component of the benzene, naphthalene, pyrazolone, 6-hydroxypyrid-2-one or acetoacetic acid arylamide series, in which $D_1$, E and K can contain substituents customary for azo dyestuffs, such as, for example, hydroxy, amino, methyl, methoxy, ethoxy, sulfo and carboxy groups, optionally substituted alkanoylamino groups having 2 to 4 carbon atoms in the alkanoyl radical, ureido, ($C_1$-$C_4$)-alkylureido, phenylureido and optionally substituted benzoylamino groups, and halogen atoms, such as bromine and chlorine atoms, and $D_1$, E and K together have at least two sulfo groups, preferably 3 or 4 sulfo groups, v is the number zero or 1, Z is a group of the formula (3) or, preferably, of the formula (3a) or (3b) and $R^G$ is a group of the formula (5)

(5)

where Y, V, h, z and y have the abovementioned meaning.

Dyestuffs which are furthermore preferred are disazo dyestuffs of the formula (4c) or (4d)

(4c)

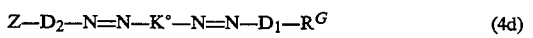

(4d)

in which $R^G$ has the abovementioned meaning, $D_1$ and $D_2$ independently of one another are the radical of a diazo component of the benzene or naphthalene series and K° is the radical of a bivalent coupling component of the naphthalene series, in which $D_1$, $D_2$ and K° can carry the substituents customary for azo dyestuffs, such as those already mentioned above, and in which $D_1$, $D_2$ and K° together contain at least two, such as 2 to 5, solubilizing groups, preferably carboxy, sulfo and sulfato groups.

Such azo dyestuffs of the formula (1) are, in particular, dyestuffs of the formulae (4e), (4f) and (4g)

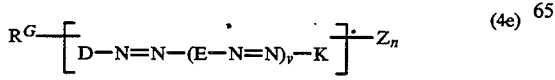

(4e)

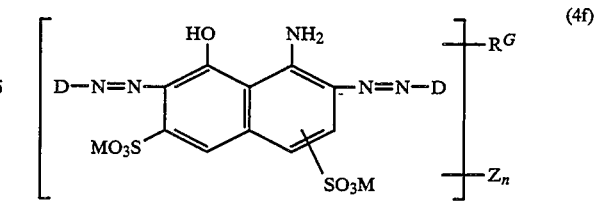

(4f)

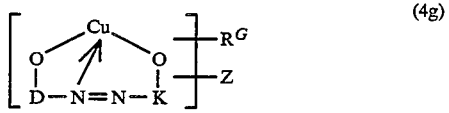

(4g)

in which $R^G$ has one of the above meanings and is bonded to D or K,

Z is a radical of the formula (3) or (3a) or (3b), n is the number 1 or 2, preferably 1, the radical Z is bonded to the radical D or to the radical K or, if n is 2, in each case to D and K or in both cases to D, $R^G$ and Z preferably not being bonded simultaneously to D and K, D is the radical of a diazo component to which a further azo radical can be bonded, an the two D in formula (4f) can be identical to or different from one another, and D is, for example, a radical $D_1$ with the meaning given above or below, E is the bivalent radical of a diazotizable compound which is capable of coupling, for example having the meaning given above or below, K is the radical of a coupling component, to which a further azo radical can be bonded, for example having the meaning given above or below, v is the number zero or 1 and M is a hydrogen atom or an alkali metal, such as sodium, potassium or lithium.

Azo dyestuffs of the formula (4e) according to the invention which are to be singled out in particular are those of the formula (4h)

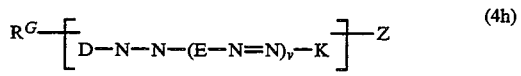

(4h)

in which $R^G$ is bonded to D or K and, alternatively, to this, Z is bonded to K or D, $R^G$ is a group of the formula (5A)

(5A)

where Y and z have the abovementioned particularly preferred meaning, and

Z, D, E, K and v have one of the abovementioned particularly preferred meanings.

Preferred metal complex azo dyestuffs according to the invention are, for example, copper complex azo dyestuffs of the formula (4j)

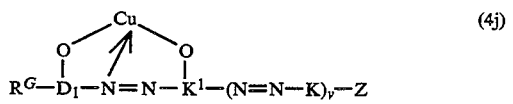

(4j)

in which $D_1$, K, v and Z have one of the abovementioned meanings and $D_1$ is preferably a radical which can be seen below from formula (5c) or (5d), and $K^1$ is the radical of a coupling component which originally contains amino and hydroxy groups, such as, preferably, the radical of an aminonaphthol which is optionally substituted by 1 or 2 sulfo groups, and in which the two carboxy groups which bond the copper as a complex are bonded to $D_1$ and $K_1$ in the ortho-position or vicinal position relative to the azo group.

Aromatic radicals of diazo components which carry a fiber-reactive group of the formula Y—SO$_2$—, such as of those of the formulae R$^G$—D—NH$_2$ or R$^G$—D$_1$—NH$_2$, are, for example, those of the formula (5a), (5b), (5c) and (5d)

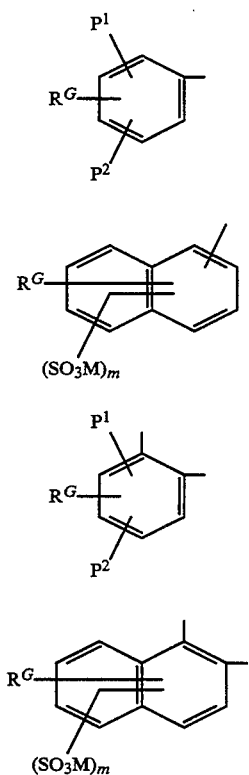

in which

R$^G$ is a radical of the formula (5),

P$^1$ is hydrogen, methyl, ethyl, methoxy, ethoxy, alkanoyl having 2 to 5 carbon atoms, such as acetyl and propionyl, cyano, carboxy, sulfo, alkoxycarbonyl having 2 to 5 carbon atoms, such as methoxycarbonyl and ethoxycarbonyl, carbamoyl, N—(C$_1$-C$_4$-alkyl)carbamoyl, fluorine, chlorine, bromine or trifluoromethyl, P$^2$ is hydrogen, methyl, ethyl, methoxy, ethoxy, cyano, carboxy, sulfo, alkanoylamino having 2 to 5 carbon atoms, such as acetylamino, alkoxycarbonyl having 2 to 5 carbon atoms, such as methoxycarbonyl and ethoxycarbonyl, carbamoyl, N—(C$_1$-C$_4$-alkyl)-sulfamoyl, alkylsulfonyl having 1 to 4 carbon atoms, phenylsulfonyl or phenoxy, and the benzene nucleus in formula (5a) and (5b) can additionally contain a hydroxy group in the ortho-position relative to the free bond leading to the azo group, m is the number zero, 1 or 2 (this group being a hydrogen atom if m is zero) and M has the abovementioned meaning.

Preferably, of these radicals, P$^1$ is hydrogen, methyl, methoxy, bromine, chlorine, carboxy or sulfo, and P$^2$ is hydrogen, methyl, methoxy, chlorine, carboxy, sulfo or acetylamino.

Examples of groups of the formula (5a) and (5b) are: 2-($\beta$-sulfatoethylsulfonyl)-phenyl, 3-($\beta$-sulfatoethylsulfonyl)-phenyl, 4-($\beta$-sulfatoethylsulfonyl)-phenyl, 2-carboxy-5-($\beta$-sulfatoethylsulfonyl)-phenyl, 2-chloro-3-sulfatoethylsulfonyl)-phenyl, 2-chloro-4-($\beta$-sulfatoethylsulfonyl)-phenyl, 2-ethoxy-4- or -5-($\beta$-sulfatoethylsulfonyl)-phenyl, 2-ethyl-4-($\beta$-sulfatoethylsulfonyl)-phenyl, 2-methoxy-5- or -4-($\beta$-sulfatoethylsulfonyl)-phenyl, 2,4-diethoxy-5-($\beta$-sulfatoethylsulfonyl)-phenyl, 2,4-dimethoxy-5-($\beta$-sulfatoethylsulfonyl)-phenyl, 2,5-dimethoxy-4-($\beta$-sulfatoethylsulfonyl)-phenyl, 2-methoxy-5-methyl-4-($\beta$-sulfatoethylsulfonyl)-phenyl, 2- or 3- or 4-($\beta$-thiosulfatoethylsulfonyl)-phenyl, 2-methoxy-5-($\beta$-thiosulfatoethylsulfonyl)-phenyl, 2-sulfo-4-($\beta$-phosphatoethylsulfonyl)-phenyl, 2-sulfo-4-vinylsulfonyl-phenyl, 2-hydroxy-4- or -5-($\beta$-sulfatoethylsulfonyl)-phenyl, 2-chloro-4- or -5-($\beta$-chloroethylsulfonyl)-phenyl, 2-hydroxy-3-sulfo-5-($\beta$-sulfatoethylsulfonyl)-phenyl, 3- or 4-($\beta$-acetoxyethylsulfonyl)-phenyl, 5-($\beta$-sulfatoethylsulfonyl)-naphth-2-yl, 6- or 7- or 8-($\beta$-sulfatoethylsulfonyl)-naphth-2-yl, 6-($\beta$-sulfatoethylsulfonyl)-1-sulfo-naphth-2-yl, 5-($\beta$-sulfatoethylsulfonyl)-1-sulfo-naphth-2-yl, 8-($\beta$-sulfatoethylsulfonyl)-6-sulfo-naphth-2-yl, 3- or 4-{$\beta$-[4-($\beta'$-sulfatoethylsulfonyl)-phen]-ethylamino}-phenyl, 3- or 4-{$\beta$-[2-sulfo-4-($\beta'$-sulfatoethylsulfonyl)-phen]-ethylamino}-phenyl, 3- or 4-[$\beta$-($\beta'$-chloroethylsulfonyl)-ethylamino]-phenyl, 3- or 4-[$\beta$-($\beta'$-sulfatoethylsulfonyl)-ethylamino]-phenyl, 3- or 4-[$\beta$-(vinylsulfonyl)-ethylamino]-phenyl, 3- or 4-[$\gamma$-($\beta'$-chloroethylsulfonyl)-propylamino]-phenyl, 3- or 4-[$\gamma$-($\beta'$-sulfatoethylsulfonyl)-propylamino]-phenyl, 3- or 4-[$\gamma$-(vinylsulfonyl)-propylamino]-phenyl, 3,4-di-($\beta$-sulfatoethylsulfonyl)-phenyl, 2,5-di-($\beta$-sulfatoethylsulfonyl)-phenyl, 4-[$\gamma$-($\beta'$-sulfatoethylsulfonyl)-propoxy]-phenyl, 2,5-bis-[($\beta$-sulfatoethylsulfonyl)methyl]-phenyl, 3- or 4-{N-[$\gamma$-($\beta'$-sulfatoethylsulfonyl)-propyl-amidocarbonyl]}-phenyl, 3,5-bis-{N-[$\gamma$-[$\beta'$-sulfatoethylsulfonyl)-propyl-amidocarbonyl]}-phenyl, 3-sulfo-4-{[N-$\gamma$-[$\beta'$-sulfatoethylsulfonyl)-propyl-amidocarbonyl]-methoxy}-phenyl and 4-{N-$\gamma$-($\beta'$-sulfatoethylsulfonyl)-propyl-amidocarbonyl]-methoxy}-phenyl.

Aromatic radicals of diaminobenzene and diaminonaphthalene compounds corresponding to the formulae H$_2$N—D—NH$_2$ and H$_2$N—N—D$_2$—NH$_2$, which contain the fiber-reactive radical Z and serve as diazo components, are preferably radicals of the formulae (6a) and (6b)

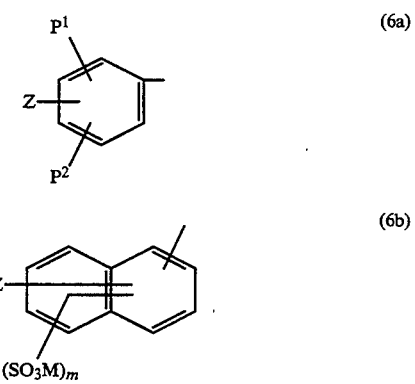

in which Z, M, m, P$^1$ and P$^2$ have the abovementioned particularly preferred meanings, and in which the benzene nucleus in formulae (6a) and (6b) can additionally contain a hydroxy group in the ortho-position relative to the free bond leading to the azo group.

Aromatic radicals E of a diazotizable compound of the formula H—E—NH$_2$ which is capable of coupling are, for example, those of the formulae (7a), (7b) and (7c)

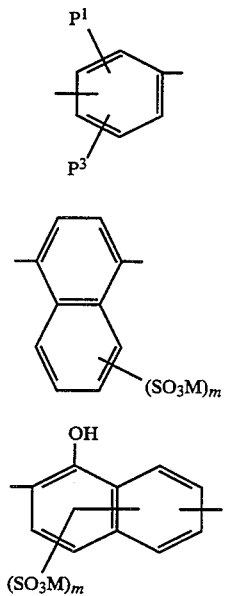

(7a)

(7b)

(7c)

in which

P$^1$, M and m have the abovementioned meanings and

P$^3$ is hydrogen, alkyl having 1 to 4 carbon atoms, such as methyl or ethyl, alkoxy having 1 to 4 carbon atoms, such as methoxy and ethoxy, chlorine, alkanoylamino having 2 to 5 carbon atoms, such as acetylamino and propionylamino, benzoylamino, ureido, phenylureido, alkylureido having 1 to 4 carbon atoms in the alkyl radical, phenylsulfonyl or alkylsulfonyl having 1 to 4 carbon atoms.

Radicals —K—R$^G$ of coupling components of the formula H—K—R$^G$ which carry the fiber-reactive group of the formula —SO$_2$—Y are, for example, those of the formulae (8a) to (8h)

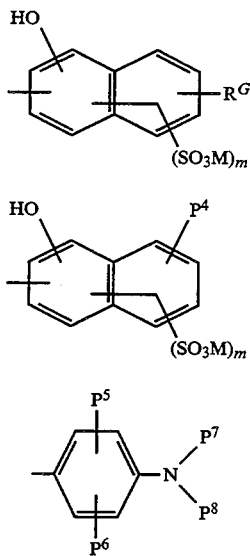

(8a)

(8b)

(8c)

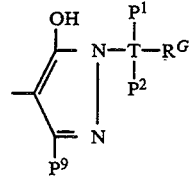

(8d)

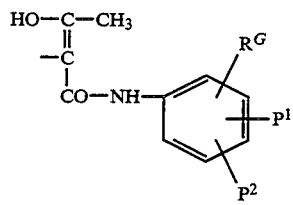

(8e)

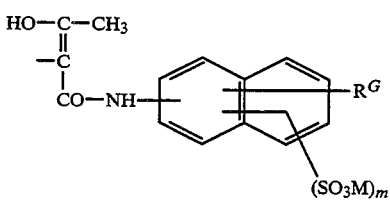

(8f)

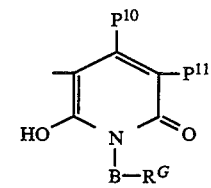

(8g)

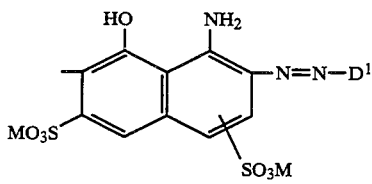

(8h)

in which

R$^G$, P$^1$, P$^2$, m and M have the abovementioned meanings,

P$^4$ is phenylureido, which can be substituted in the phenyl radical by chlorine, methyl, methoxy, sulfo and/or carboxy, and is substituted by a group —SO$_2$—Y, where Y has the above meaning, or is benzoylamino, which can be substituted in the benzene radical by chlorine, methyl, methoxy, nitro, sulfo and/or carboxy and is substituted by a group —SO$_2$—Y, where Y has the above meaning, P$^5$ is hydrogen, alkyl having 1 to 4 carbon atoms, such as methyl and ethyl, alkoxy having 1 to 4 carbon atoms, such as methoxy and ethoxy, bromine, chlorine or alkanoylamino having 2 to 7 carbon atoms, such as acetylamino and propionylamino, P$^6$ is hydrogen, alkyl having 1 to 4 carbon atoms, such as methyl and ethyl, alkoxy having 1 to 4 carbon atoms, such as methoxy and ethoxy, chlorine or alkanoylamino having 2 to 7 carbon atoms, such as acetylamino and propionylamino, ureido or phenylureido, P$^7$ is hydrogen or alkyl having 1 to 4 carbon atoms, which can be substituted by hydroxy, cyano, carboxy, sulfo, sulfato, methoxycarbonyl, ethoxycarbonyl or acetoxy or by a group —SO₂—Y having the above definition, P⁸ is alkyl having 1 to 4 carbon atoms, which can be substituted by hydroxy, cyano, carboxy, sulfo, sulfato, methoxycarbonyl, ethoxycarbonyl or acetoxy and is substituted by a group —SO₂—Y having the above definition, or is benzyl or phenyl or phenyl which is substituted by alkyl having 1 to 4 carbon atoms, alkoxy having 1 to 4 carbon atoms, chlorine and/or sulfo, the phenyl radical in each case being substituted by a group —SO₂—Y having the above definition, P⁹ is hydrogen, alkyl having 1 to 4 carbon atoms, such as methyl, cyano, carboxy, carbalkoxy having 2 to 5 carbon atoms, such as carbomethoxy and carbethoxy, carbamoyl or phenyl, preferably methyl, carboxy, methoxycarbonyl, ethoxycarbonyl or phenyl, and in particular methyl or carboxy, T is a benzene or naphthalene ring, preferably a benzene ring, P¹⁰ is hydrogen or alkyl having 1 to 4 carbon atoms, such as methyl, or alkyl having 1 to 4 carbon atoms, which is substituted by alkoxy having 1 to 4 carbon atoms, such as methoxy, or cyano, preferably alkyl having 1 to 4 carbon atoms or phenyl, P¹¹ is hydrogen, chlorine, bromine, sulfo, carbamoyl, methylsulfonyl, phenylsulfonyl, cyano or sulfoalkyl having 1 to 4 carbon atoms, preferably hydrogen, sulfo, sulfoalkyl with an alkyl radical having 1 to 4 carbon atoms, such as sulfomethyl, cyano or carbamoyl, B is alkylene having 1 to 4 carbon atoms, methylenephenylene, ethylenephenylene, phenylenemethylene, phenylene-ethylene or phenylene, or methylenephenylene, ethylenephenylene or phenylene which is substituted in the benzene radical by fluorine, chlorine, bromine, methyl, methoxy, cyano, sulfo, carboxy, aceto, nitro, carbamoyl and/or sulfamoyl, and D¹ is a radical of the formula (5a) or (5b).

Radicals —K—Z of coupling components of the formula H—K—Z or H—K—N(Rˣ)H are, for example, radicals of formulae (9a) to (9h)

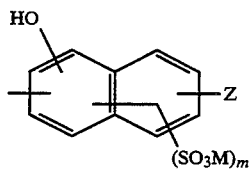

(9a)

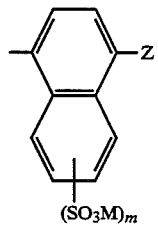

(9b)

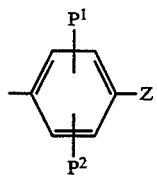

(9c)

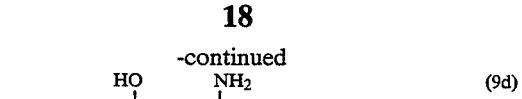

(9d)

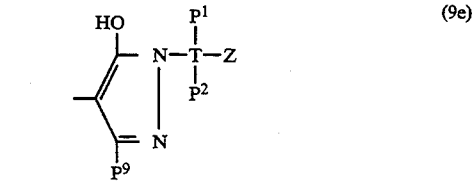

(9e)

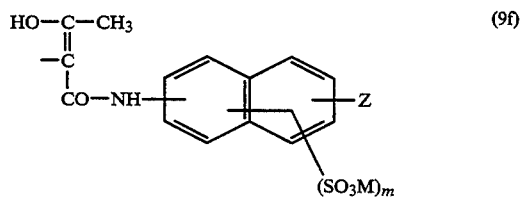

(9f)

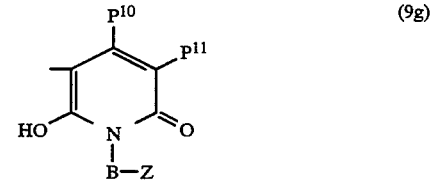

(9g)

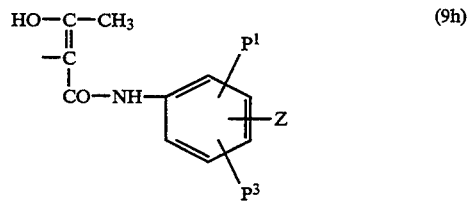

(9h)

in which

R, P¹, P², P⁹, P¹⁰, P¹¹, B, T, M, m and Z have the abovementioned particularly preferred meanings and D², as the radical of a diazo component, is a radical of the abovementioned defined formula (6a) or (6b).

In the above formulae (8a), (8b) and (9a), the free bond leading to the azo group is bonded in the ortho-position, relative to the hydroxy groups, to the aromatic nucleus.

Radicals K and K¹ in the formulae (4h) and (4g) which have an oxygen atom which bonds the metal as a complex, and contain the group Z are, in particular, those of the formulae (10a) to (10e)

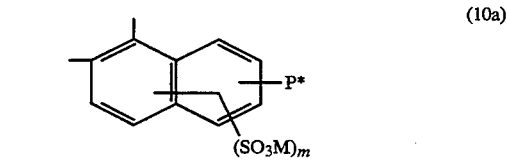

(10a)

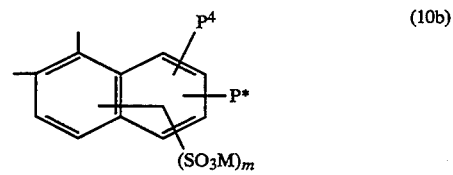

(10b)

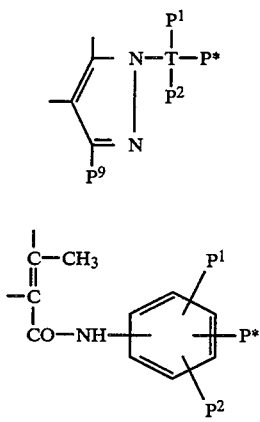 (10c)
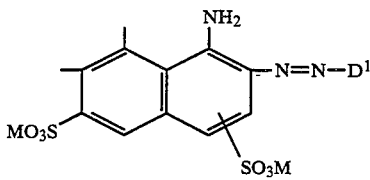 (10e)
(10d)
in which the individual formula members have one of the abovementioned meanings and P* is either a radical Z or a grouping of the formula —N=N—K—Z.
Azo dyestuffs which are furthermore preferred are those which correspond to the formulae (12A) to (12V), and of these in particular those corresponding to the formulae (12A), (12B), (12E), (12F), (12G), (12J), (12K), (12N), (12P) and (12V):
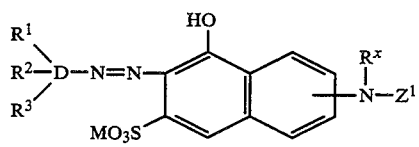 (12A)
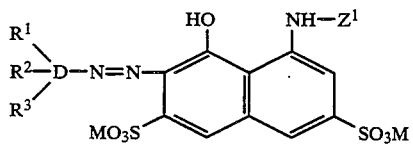 (12B)
(12C)
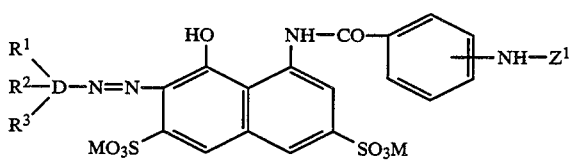 (12D)
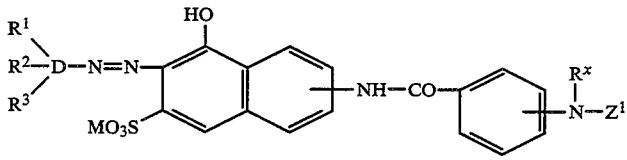 (12E)
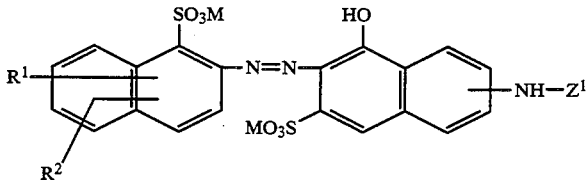 (12F)
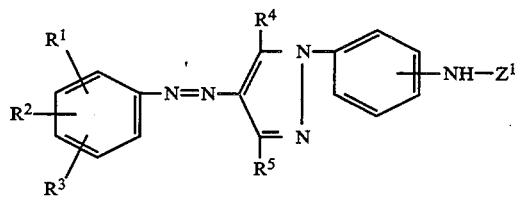 (12G)
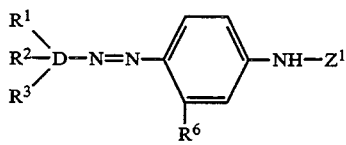

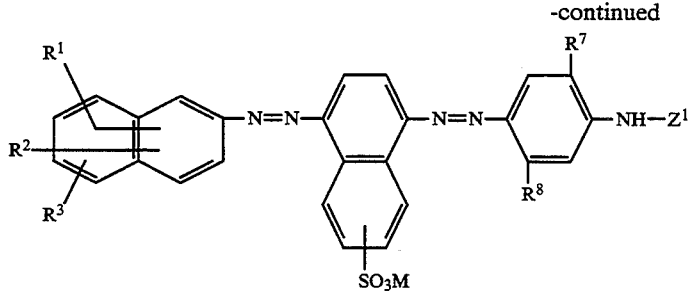
(12H)
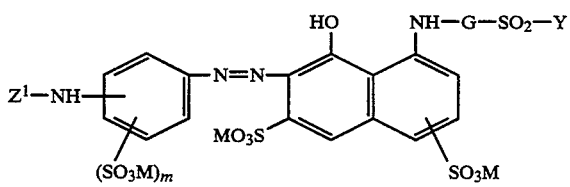
(12J)
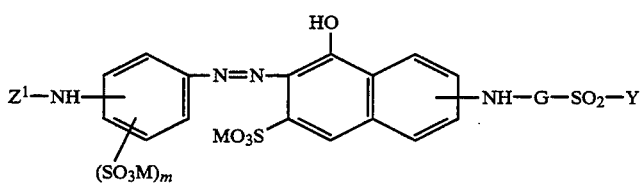
(12K)
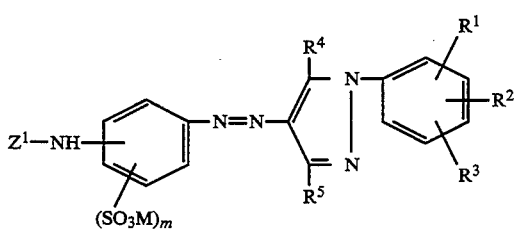
(12L)
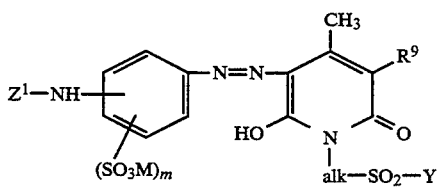
(12M)
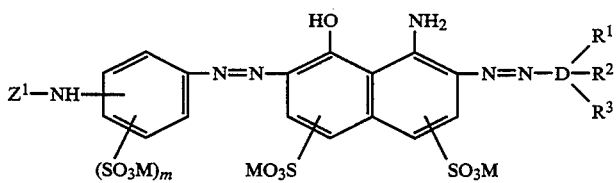
(12N)
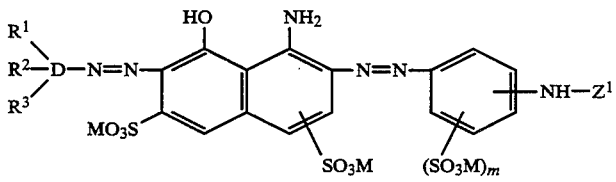
(12P)
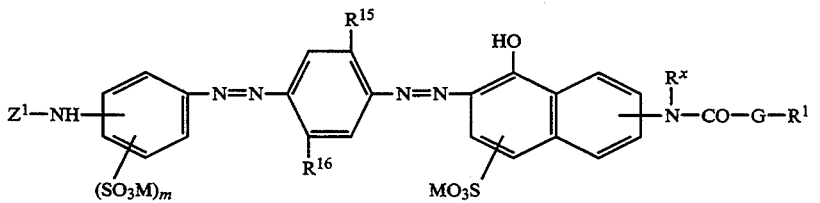
(12Q)

-continued

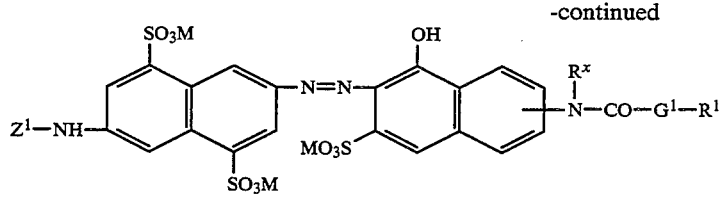 (12R)

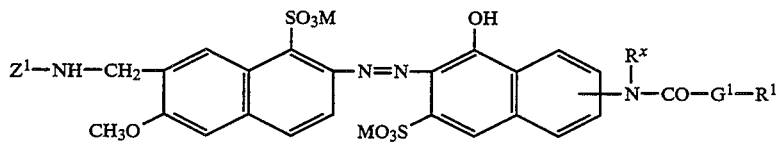 (12S)

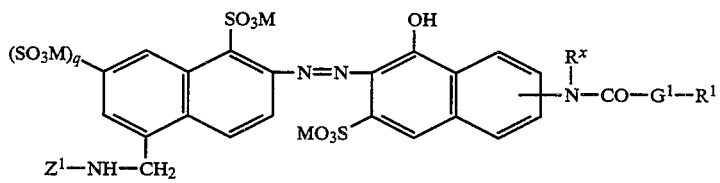 (12T)

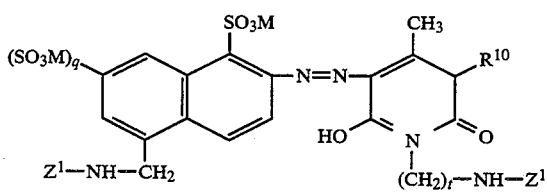 (12U)

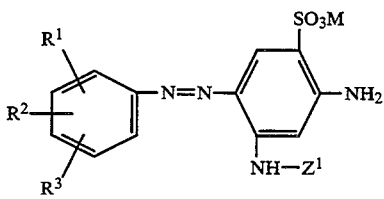 (12V)

In these formulae:

$Z^1$ is a radical of the formula (3A), (3B) or (3C)

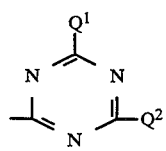 (3A)

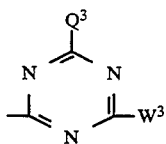 (3B)

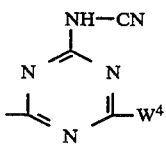 (3C)

in which $Q^1$, $Q^2$, $Q^3$, $W^3$ and $W^4$ have the abovementioned meanings;

M has one of the abovementioned meanings;

$R^x$ is hydrogen or alkyl having 1 to 4 carbon atoms, such as methyl or ethyl, preferably hydrogen;

D is a benzene ring or is a naphthalene ring, in which the azo group is preferably bonded to the naphthalene ring in the β-position and in which, if D is the naphthalene ring, $R^2$ and $R^3$ are preferably each, independently of one another, a hydrogen atom or a sulfo group;

$R^1$ is β-sulfatoethylsulfonyl, β-chloroethylsulfonyl or vinylsulfonyl;

$R^2$ is hydrogen, alkyl having 1 to 4 carbon atoms, such as ethyl and, in particular, methyl, alkoxy having 1 to 4 carbon atoms, such as ethoxy and, in particular, methoxy, halogen, such as chlorine and bromine, carboxy, sulfo or a group of the formula —$SO_2$—Y, where Y has the abovementioned meaning, such as β-sulfatoethylsulfonyl, β-chloroethylsulfonyl or vinylsulfonyl, and is preferably hydrogen;

$R^3$ is hydrogen, alkyl having 1 to 4 carbon atoms, such as ethyl and, in particular, methoxy, alkoxy having 1 to 4 carbon atoms, such as ethoxy and, in particular, methoxy, halogen, such as chlorine and bromine, carboxy or sulfo, preferably hydrogen;

$R^4$ is hydroxy or amino, preferably hydroxy;

$R^5$ is methyl, carboxy, carbomethoxy or carbethoxy, preferably methyl or carboxy;

$R^6$ is acetylamino, ureido or methyl;

$R^7$ is hydrogen, alkyl having 1 to 4 carbon atoms, such as methyl and ethyl, alkoxy having 1 to 4 carbon atoms, such as methoxy and ethoxy, halogen, such as bromine and, in particular, chlorine, preferably hydrogen, methyl, ethyl, methoxy, ethoxy or chlorine;

$R^8$ is hydrogen or alkyl having 1 to 4 carbon atoms, such as methyl and ethyl, alkanoylamino having 2 to 5 carbon atoms, such as acetylamino and propionylamino, or ureido, preferably hydrogen, methyl, ethyl, methoxy, ethoxy, acetylamino or ureido;

$R^9$ is hydrogen, cyano, carbamoyl, sulfamoyl or sulfomethyl, preferably hydrogen or carbamoyl;

$R^{10}$ is cyano, carbamoyl or sulfomethyl;

alk is alkylene having 2 to 4 carbon atoms, preferably ethylene;

G is alkylene having 2 to 4 carbon atoms, preferably ethylene or, in particular, n-propylene, or is carbonylphenylene;

$G^1$ is phenylene, or is a radical of the formula $-NH-(CH_2)_3-$;

m is the number zero, 1 or 2 (this group being hydrogen if m is zero);

q is the number zero or 1 (this group being hydrogen if q is zero);

t is the number 2 or 3; and in the compounds of the formula (12A), (12D), (12E), (12K) and (12Q) to (12T), the amino grouping with the fiber-reactive radical is bonded to the 8-naphthol radical in the 2- or 3-position.

The present invention furthermore relates to processes for the preparation of the dyestuffs of the formula (1) according to the invention. They can be prepared in a manner which is customary per se, by synthesis routes which are analogous to known synthesis routes specific for the particular dyestuff class, by reacting typical precursors for the particular dyestuff, at least one of which contains a group of the formula (3) and at least one of which contains a group of the formula (5) (it being possible for the group Y in the radical (5) in the starting compounds also to be a group $Y^1$ having the meaning given below) with one another or by starting from a starting compound containing an amino group, of the formula (20)

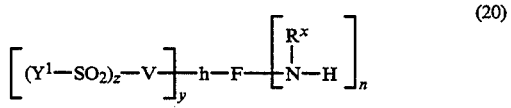

(20)

in which F, $R^x$, V, h, y, z and n have the abovementioned meanings and $Y^1$ has one of the meanings given above for Y or is the β-hydroxyethyl group, and reacting this, a trihalogeno-s-triazine of the formula (21)

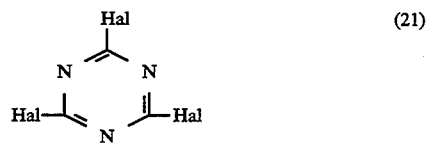

(21)

in which Hal is a halogen atom, such as, in particular, a chlorine or fluorine atom, a compound of the formula $H-Q^1$ and a compound of the formula $H-Q^2$, where $Q^1$ and $Q^2$ have the abovementioned meaning, with one another in stoichiometric amounts in any desired sequence, and if appropriate subsequently carrying out further conversion reactions which are required and are familiar to the expert, such as, for example, if starting compounds where the group $Y^1$ is β-hydroxyethyl are employed, subsequently converting the resulting compound with the β-hydroxyethylsulfonyl group into the dyestuff according to the invention with a group $Y-SO_2-$ having the above meaning.

In particular, the dyestuffs according to the invention can be prepared according to the invention by reacting a compound corresponding to the formula (22)

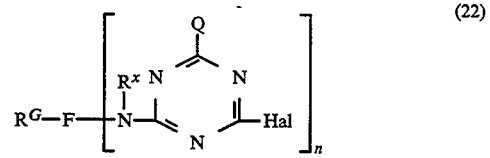

(22)

in which $R^G$, F, $R^x$ and n have the abovementioned meanings, and in which $R^G$ can also contain the group $Y^1-SO_2-$ instead of the group $Y-SO_2-$, Hal is a halogen atom, such as, in particular, a chlorine or fluorine atom, and Q is the radical $Q^1$ or $Q^2$, with a compound of the formula $H-Q^1$ or $H-Q^2$, or reacting a compound of the formula (20) with a compound of the formula (23)

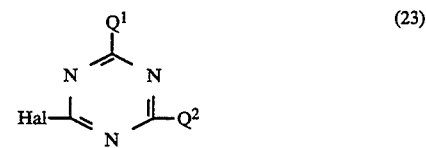

(23)

where Hal, $Q^1$ and $Q^2$ have the abovementioned meaning.

The reactions of the starting compounds are carried out in suspension or solution in an aqueous or aqueous-organic medium. If the reactions are carried out in an aqueous-organic medium, the organic medium is, for example, acetone, dimethylformamide or N-methylpyrrolidone. The hydrogen halide liberated during the condensation reaction is advangtageously neutralized continuously by addition of aqueous alkali metal hydroxides, carbonates or bicarbonates.

The reactions of the compounds of the formula (22) with a compound of the formula $H-Q^1$ or $H-Q^2$ are as a rule carried out at a pH of between 2 and 12, preferably between 3 and 6, and at a temperature of between 10° and 100° C., preferably between 40° and 80° C.

The reactions of the compounds of the formula (20) with a halogenotriazine compound of the formula (23) are as a rule carried out at a pH of between 2 and 8, preferably between 3 and 6, and at a temperature of between 20° and 110° C., preferably between 40° and 80° C.

The starting compounds of the formula (22) are obtained by reaction of a starting compound of the formula (20) with a dihalogenotriazine compound of the formula (24)

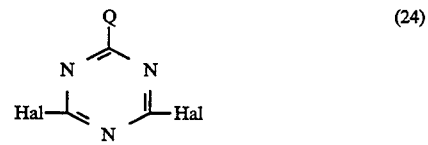

(24)

where Hal and Q have the abovementioned meaning. The reaction is as a rule carried out at a pH of between 2 and 10, preferably between 2 and 7, and at a temperature of between 0° and 60° C., preferably between 10° and 50° C.

The starting compounds of the formula (23) are obtained by reaction of a trihalogeno-s-triazine, such as cyanuric chloride or cyanuric fluoride, with a compound of the formula H—$Q^1$ and H—$Q^2$ in any desired sequence, although the trihalogeno-s-triazine is preferably reacted first with that compound H—$Q^1$ or H—$Q^2$ which has the lowest basicity. The same also applies to the preparation of the starting compounds of the formula (24). Preferably, therefore, the radical Q in formula (24) and the radical $Q^1$ or $Q^2$ first introduced into formula (23) is, for example, the cyanamido radical or a radical of the formula (2c) or (2f) and (2d). The reaction of the trihalogeno-s-triazine with the first compound H—$Q^1$ or H—$Q^2$ is as a rule carried out at a pH of between 2 and 10, preferably between 3 and 9, and at a temperature of between 0° and 20° C, preferably between 0° and 10° C., and the reaction with the second compound H—$Q^2$ or, respectively, H—$Q^1$ is as a rule carried out at a pH of between 2 and 10, preferably between 3 and 9, and at a temperature of between 20° and 80° C., preferably between 30° and 60° C.

Which of the abovementioned procedures both for the synthesis of the dyestuffs of the formula (1) and for the synthesis of the starting compounds having a triazine radical can advantageously be used depends on the one hand on the solubility of the starting compounds employed and of the intermediate products, and on the reaction conditions to be chosen in respect of the basicity of the reactants to give one of the trihalogeno- or dihalogeno- or monohalogeno-s-triazine compounds, and can be decided upon from case to case by a small preliminary experiment. The preparation, according to the invention, of the dyestuffs of the formula (1) by reaction of a compound of the formula (22) with a compound of the formula H—$Q^1$ or H—$Q^2$ is particularly suitable in that case where the starting compound (22) contains a group which is sensitive toward alkali, such as, for example, a fiber-reactive group $R^G$ which is particularly sensitive toward alkali, and the reaction with the compound H—$Q^1$ or H—$Q^2$ can be started under acid or neutral conditions.

On the other hand, if this second group $Q^1$ or $Q^2$ can be introduced into the dyestuff molecule having a group which is sensitive toward alkali or into a corresponding precursor having a group which is sensitive toward alkali only under alkaline conditions, a starting compound in which the radical Y corresponds to the radical $Y^1$ and is the β-hydroxyethyl group is preferably used.

If a starting compound where $Y^1$ is the β-hydroxyethyl group is used, subsequent conversion of the β-hydroxyethyl group into a group Y which is an ethyl group substituted in the β-position by a substituent which can be eliminated under alkaline conditions, is carried out analogously to known procedures for such reactions, which are described in the literature in numerous instances for dyestuffs having the fiber-reactive radical of the vinylsulfonyl type. As a rule, the β-hydroxyethylsulfonyl group is first esterified, thus, for example, converted into the ester group of phosphoric acid, of a lower alkanecarboxylic acid, of an aromatic sulfonic acid or, preferably, of sulfuric acid. This esterification reaction is carried out with the customary esterifying and acylating agents for such acids, such as, for example, acetic anhydride, polyphosphoric acid, phosphorus pentachloride and, in particular, 96–100% strength sulfuric acid or sulfuric acid containing sulfur trioxide, such as oleum having a sulfur trioxide content of up to 35%, or chlorosulfonic acid, for introduction of the sulfato group. The reaction with sulfuric acid or sulfuric acid containing sulfur trioxide is carried out at a temperature of between 0° C. and 25° C. The reaction with chlorosulfonic acid can also be carried out in a polar organic solvent, such as, for example, N-methylpyrrolidone, at 10° to 80° C.

The dyestuffs of the formula (1) according to the invention can be converted by a customary and known procedure into dyestuffs of the formula (1) according to the invention having another group of the formula —$SO_2$—Y. Such procedures are described in numerous instances in the literature relating to fiber-reactive dyestuffs having the fiber-reactive radical of the vinylsulfone series. Thus, dyestuffs according to the invention containing the β-sulfatoethylsulfonyl radical can be converted into dyestuffs according to the invention containing the vinylsulfonyl group by treatment with an alkali, such as in aqueous sodium hydroxide solution, at a temperature of from 0° to 40° C. for a few minutes. Dyestuffs according to the invention containing the β-thiosulfatoethylsulfonyl radical can be obtained, for example, from dyestuffs containing the vinylsulfonyl group by reaction with sodium thiosulfate.

If diazo and coupling components which contain the groups of the formula (3) and (5) are used as starting substances in the synthesis according to the invention of the azo dyestuffs, the reactions are carried out by the customary procedure for diazotization and coupling reactions, thus, the diazotization is as a rule carried out at a temperature of between $-5°$ C. and $+15°$ C. and at a pH of below 2, by means of a strong acid and an alkali metal nitrite in a preferably aqueous medium, and the coupling reaction is as a rule carried out at a pH of between 1.5 and 4.5, in the case of a coupling component containing an amino group, and at a pH of between 3 and 7.5, in the case of a coupling component containing a hydroxy group, and at a temperature of between 0° and 25° C., likewise preferably in an aqueous medium.

For the synthesis according to the invention of heavy metal complex azo dyestuffs, for example those corresponding to the formula (4g), those azo compounds which are free from heavy metals, which contain, in the coupling component, a phenolic or naphtholic hydroxy group bonded in the ortho-position or vicinal position relative to the azo group and in which the diazo component radical contains a hydrogen atom or a hydroxy group or a lower alkoxy group, such as methoxy group, in the ortho-position relative to the azo group, are as a rule used as starting substances, it furthermore being possible for the starting azo compounds which are free from heavy metals to contain an acylamino radical in bonded form, such as an acetylamino radical. For example, for the synthesis of the copper complex azo dyestuffs of the formula (4g), such as (4j), a starting compound corresponding to the formula (25)

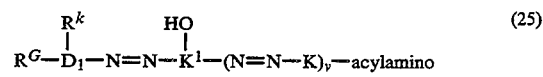

in which $D_1$, K, $K^1$ and v have one of the abovementioned meanings and $R^k$ is a hydrogen atom or a hydroxy or methoxy group bonded to $D_1$ in the ortho-position relative to the azo group, can be used as the starting substance, and this starting azo compound containing an acylamino group can be reacted with a copper-donating agent, such as a copper salt, analogously to known and customary procedures. If $R^k$ is a hydrogen atom or a methoxy group, the compound (25) can be subjected to an oxidative or dealkylating coppering reaction, which is to be carried out by a customary route. The copper complex azo compound containing the acylamino group now obtained can then be reacted, after or with hydrolysis of the acylamino group to give the amino group, with a cyanuric halide or a compound of the formula (23) analogously to known procedures to give the dyestuff of the formula (1) according to the invention.

Starting compounds which have a fiber-reactive grouping $R^G$ and can serve as a diazo components are, for example: 2-(β-sulfatoethylsulfonyl)-aniline, 3-(β-sulfatoethylsulfonyl)-aniline, 4-(β-sulfatoethylsulfonyl)-aniline, 2-carboxy-5-(β-sulfatoethylsulfonyl)-aniline, 2-chloro-3-(β-sulfatoethylsulfonyl)-aniline, 2-chloro-4-(β-sulfatoethylsulfonyl)-aniline, 2-ethoxy-4- or -5-(β-sulfatoethylsulfonyl)-aniline, 2-ethyl-4-(β-sulfatoethylsulfonyl)-aniline, 2-methoxy-5- or -4-(β-sulfatoethylsulfonyl)-aniline, 2,4-diethoxy-5-(β-sulfatoethylsulfonyl)-aniline, 2,4-dimethoxy-5-(β-sulfatoethylsulfonyl)-aniline, 2,5-dimethoxy-4-(β-sulfatoethylsulfonyl)-aniline, 2-methoxy-5-methyl-4-(β-sulfatoethylsulfonyl)-aniline, 2- or 3- or 4-(β-thiosulfatoethylsulfonyl)-aniline, 2-methoxy-5-(β-thiosulfatoethylsulfonyl)-aniline, 2-sulfo-4-(β-phosphatoethylsulfonyl)-aniline, 2-sulfo-4-vinylsulfonyl-aniline, 2-hydroxy-4- or -5-(β-sulfatoethylsulfonyl)-aniline, 2-chloro-4- or -5-(β-chloroethylsulfonyl)-aniline, 2-hydroxy-3-sulfo-5-(β-sulfatoethylsulfonyl)-aniline, 3- or 4-(β-acetoxyethylsulfonyl)-aniline, 5-(β-sulfatoethylsulfonyl)-2-amino-naphthalene, 6- or 7- or 8-(β-sulfatoethylsulfonyl-2-amino-naphthalene, 6-(β-sulfatoethylsulfonyl)-1-sulfo-2-aminonaphthalene, 5-(β-sulfatoethylsulfonyl)-1-sulfo-2-amino-naphthalene, 8-(β-sulfatoethylsulfonyl)-6-sulfo-2-amino-naphthalene, 3- or 4-{β-[4-(β'-sulfatoethylsulfonyl)-phen]-ethylamino}-aniline, 3- or 4-{β-[2-sulfo-4-(β'-sulfatoethylsulfonyl)-phen]-ethylamino}-aniline, 3- or 4-[β-(β'-chloroethylsulfonyl)-ethylamino]-aniline, 3- or 4-[β-(β'-sulfatoethylsulfonyl)-ethylamino]-aniline, 3- or 4-[β-(vinylsulfonyl)-ethylamino]-aniline, 3- or 4-[γ-(β'-chloroethylsulfonyl)-propylamino]-aniline, 3- or 4-[γ-(β'-sulfatoethylsulfonyl)-propylamino]-aniline, 3- or 4-[γ-(vinylsulfonyl)-propylamino]-aniline, 3,4-di-(β-sulfatoethylsulfonyl)-aniline, 2,5-di-(β-sulfatoethylsulfonyl)-aniline, 4-[γ-(β'-sulfatoethylsulfonyl)-propoxy]-aniline, 2,5-bis-[(β-sulfatoethylsulfonyl)-methyl]-aniline, 3- or 4-{N-[γ-(β'-sulfatoethylsulfonyl)-propylamidocarbonyl]}-aniline, 3,5-bis-{N-[γ-[β'-sulfatoethylsulfonyl)-propylaminocarbonyl]}-aniline, 3-sulfo-4-{[N-γ-[β'-sulfatoethylsulfonyl)-propylaminocarbonyl]-methoxy}-aniline and 4-{N-γ-(β'-sulfatoethylsulfonyl)-propylamidocarbonyl]-methoxy}-aniline.

Starting compounds corresponding to the formula $H_2N-D-NH_2$ or $H_2N-D_1-NH_2$ are, for example, 1,4-phenylene-diamine, 1,4-phenylenediamine-2-sulfonic acid, 1,4-phenylenediamine-2-carboxylic acid, 1,4-diamino-naphthalene-2-sulfonic acid, 2,6-diamino-naphthalene-8-sulfonic acid, 2,6-diamino-naphthalene-4,8-disulfonic acid, 1,3-phenylene-diamine, 1,3-phenylenediamin-4-sulfonic acid, 1,3-phenylene-diamine-4,6-disulfonic acid, 1,4-phenylenediamine-2,6-disulfonic acid, 1,4-phenylene-diamine-2,5-disulfonic acid, 1,4-diamino-naphthalene-6-sulfonic acid, 4,4'-diamino-diphenyl-3-sulfonic acid and 4,4'-diamino-stilbene-2,2'-disulfonic acid.

Starting compounds corresponding to the formula $H-E-NH_2$ which can be employed for synthesis of the disazo dyestuffs according to the invention and serve as coupling components and, after the coupling, as diazo components are, for example, aniline, 3-methyl-aniline, 2,5-dimethyl-aniline, 2,5-dimethoxy-aniline, 3-methoxy-aniline, 3-acetylamino-aniline, 3-propionylamino-aniline, 3-butyrylamino-aniline, 3-benzoylamino-aniline, 3-ureido-aniline, 2-methyl-5-acetylamino-aniline, 2-methoxy-5-acetylamino-aniline, 2-methoxy-5-methyl-aniline, 1-aminonaphthalene-6-sulfonic acid, 1-aminonaphthalene-7-sulfonic acid, 2-sulfo-5-acetylamino-aniline, 2-amino-5-naphthol-7-sulfonic acid, 2-amino-8-naphthol-6-sulfonic acid, 2-(4'-aminobenzoylamino)-5-naphthol-7-sulfonic acid, 1-(4'-amino-2-sulfo-phenyl)-3-methyl- or -3-carboxy-5-pyrazolone and N-(3-sulfo-4-amino)-acetoacetylanilide.

Starting compounds which can serve as coupling components corresponding to the formula $H-K-R^G$ for synthesis of the azo dyestuffs according to the invention are, for example, 1-[4'-(β-sulfatoethyl-sulfonyl)-phenyl]-3-methyl-5-pyrazolone, 1-[4'-(vinyl-sulfonyl)-phenyl]-3-methyl-5-pyrazolone, 1-[4'-(β-sulfatoethyl-sulfonyl)-phenyl]-3-carboxy-5-pyrazolone, 1-[3'-[β-chloroethylsulfonyl)-benzoylamino]-3,6-disulfo-8-naphthol, 1-[3'-(vinylsulfonyl)-benzoylamino]-3,6-disulfo-8-naphthol, 1-[3'-(vinylsulfonyl)-benzoylamino]-4,6-disulfo-8-naphthol, 1-[3'-(β-sulfatoethylsulfonyl)-benzoylamino]-4,6-disulfo-8-naphthol, 2-[3'-(β-chloroethylsulfonyl)-benzoylamino]-6-sulfo-8-naphthol, 2-[3'-(vinylsulfonyl)-benzoylamino]-6-sulfo-8-naphthol, 3-[3'-(β-chloroethylsulfonyl)-benzoylamino]-6-sulfo-8-naphthol, 3-[3'-(vinylsulfonyl)-benzoyl-amino]-6-sulfo-8-naphthol, 6-sulfo-1-[3'-(β-chloroethylsulfonyl)-benzoylamino]-naphthol, 7-sulfo-[3'-(vinylsulfonyl)-benzoylamino]-naphthol, 2-[N-methyl-N-(β-sulfatoethylsulfonyl)-amino]-6-sulfo-8-naphthol, 3-[N-methyl-N-(β-sulfatoethylsulfonyl)-amino]-6-sulfo-8-naphthol, 2-[N-ethyl-N-(β-sulfatoethylsulfonyl)-amino]-6-sulfo-8-naphthol, 1-[N'-(3'-β-chloroethylsulfonyl-phenyl)-ureido]-3,6-disulfo-8-naphthol, 1-[N'-(3'-vinylsulfonyl-phenyl)-ureido]-3,6-disulfo-8-naphthol, 1-[N'-(3'-vinyl-sulfonyl-propyl)-ureido]-3,6-disulfo-8-naphthol, 1-[N'-(3'-β-chloro-ethylsulfonylphenyl)-ureido]-4,6-disulfo-8-naphthol, 1-[N'-(3'-vinylsulfonyl-phenyl)-ureido]-4,6-disulfo-8-naphthol, 1-[N'-(3'-β-chloroethylsulfonyl-propyl)-ureido]-4,6-disulfo-8-naphthol, 2-[N'-(3'-β-sulfatoethylsulfonyl-phenyl)-ureido]-6-sulfo-8-naphthol, 2-[N'-(3'-chloroethylsulfonylpropyl)-ureido]-6-sulfo-8-naphthol, 3-[N'-(3'-β-chloroethylsulfonyl-phenyl)-ureido]-6-sulfo-8-naphthol, 3-[N'-(3'-vinylsulfonyl-propyl)-ureido]-6-sulfo-8-naphthol, 2-sulfo-5-[N'-(3"-β-chloroethylsulfonyl)-phenyl]-ureido-aniline, 3-[N'-(3"-β-sulfatoethylsulfonyl)-phenyl]-ureido-aniline and 6-sulfo-1-[N'-(3"-β-sulfatoethylsulfonyl)-phenyl]-ureido-8-naphthol.

Coupling components corresponding to the formula $H-K-N(R^x)H$ which can serve to build up the azo dyestuffs according to the invention in which the fiber-reactive radical Z is contained in the coupling component, in which case the fiber-reactive radical $Z^1$ or another abovementioned halogenotriazine radical can be or is subsequently introduced into the amino group $-N(R^x)H$ of the azo dyestuff corresponding to the formula (20), which contains amino groups and is initially obtained, are, for example, aniline, 3-methyl-aniline, 2,5-dimethyl-aniline, 2,5-dimethoxy-aniline,3-methoxy-aniline, 3-acetylamino-aniline, 3-propionylamino-aniline, 3-butyrylamino-aniline, 3-benzoylamino-aniline, 3-(hydroxyacetylamino)-aniline, 3- ureido-aniline, 2-methyl-5-acetylamino-aniline, 2-methoxy-5-acetylamino-aniline, 2-methoxy-5-methyl-aniline, 1-amino-naphthalene-6-sulfonic acid, 1-amino-naphthalene-7-sulfonic acid, 4-sulfo-1,3-diamino-benzene, 6-sulfo-2-methoxy-1-amino-naphthalene, 5,7-disulfo-2-aminonaphthalene, 1-amino-8-hydroxy-naphthalene-4-sulfonic acid, 1-amino-8-hydroxynaphthalene-6-sulfonic acid, 1-amino-8-hydroxynaphthalene-2,4-disulfonic acid, 1-amino-8-naphthol-3,6-disulfonic acid, 1-amino-8-hydroxy-4,6-disulfonic acid, 1-amino-8-hydroxy-naphthalene-2,4,6-trisulfonic acid, 2-(methylamino)- and 2-(ethylamino)-5-hydroxynaphthalene-7-sulfonic acid, 2-amino-5-hydroxynaphthalene-1,7-disulfonic acid, 2-(methylamino)-and 2-(ethylamino)-8-hydroxynaphthalene-6-sulfonic acid, 2-amino-8-hydroxynaphthalene-3,6-disulfonic acid, 2-(4'-amino-3'-sulfophenylamino)-5-hydroxynaphthalene-7-sulfonic acid, 1-amino-8-hydroxy-2-(phenylazo)-naphthalene-3,6-disulfonic acid, 1-amino-8-hydroxy-2-(4'-sulfophenylazo)-naphthalene-3,6-disulfonic acid, 1-amino-8-hydroxy-2-(2',5'-disulfophenylazo)-naphthalene-3,6-disulfonic acid, 1-($\beta$-aminoethyl)-3-cyano-4-methyl-6-hydroxy-pyrid-2-one, 1-($\gamma$-aminopropyl)-3-sulfomethyl-4-methyl-6-hydroxy-pyrid-2-one, 1,3-diaminobenzene, 3-[N,N-di-($\beta$-hydroxyethyl)]-amino-aniline, 3-[N,N-di-($\beta$-sulfatoethyl)]-amino-4-methoxy-aniline, 3-(sulfo-benzylamino)-aniline, 3-(sulfobenzoylamino)-4-chloro-aniline and 3-[N,N-di-(sulfobenzyl)]-amino-aniline, 2-sulfo-5-acetylamino-aniline, 2-amino-5-naphthol-7-sulfonic acid, 2-amino-8-naphthol-6-sulfonic acid, 1-(4'-aminobenzoyl)-amino-8-hydroxynaphthalene-3,6-disulfonic acid, 1-(4'-aminobenzoyl)-amino-8-hydroxynaphthalene-4,6-disulfonic acid, 1-(3'-aminobenzoyl)-amino-8-hydroxynaphthalene-3,6-disulfonic acid, 1-(3'-aminobenzoyl)-amino-8-hydroxynaphthalene-4,6-disulfonic acid, 1-(2'-aminobenzoyl)-amino-8-hydroxy-naphthalene-3,6-disulfonic acid, 1-(2'-aminobenzoyl)-amino-8-hydroxynaphthalene-4,6-disulfonic acid, 2-(3'-aminobenzoyl)-amino-5-hydroxy-naphthalene-7-sulfonic acid, 2-(2'-aminobenzoyl)-amino-5-hydroxynaphthalene-7-sulfonic acid, 2-(4'-aminobenzoyl)-amino-8-hydroxynaphthalene-6-sulfonic acid, 2-(3'-aminobenzoyl)-amino-8-hydroxynaphthalene-6-sulfonic acid, 2-(2'-aminobenzoyl)-amino-8-hydroxynaphthalene-6-sulfonic acid, 2-(4'-aminobenzoyl)-amino-5-naphthol-7-sulfonic acid, 1-(4'-amino- or 1-(4'-acetylamino-2-sulfophenyl)-3-methyl- or -3-carboxy-5-pyrazolone, N-(3-sulfo-4-amino)-acetoacetyl-anilide, 1-amino-8-naphthol-3,6- or -4,6-disulfonic acid, 1-acetylamino-8-naphthol-3,6- or -4,6-disulfonic acid, 2-acetylamino-5-naphthol-7-sulfonic acid, 2-acetylamino-8-naphthol-6-sulfonic acid, 3-acetylamino-8-naphthol-6-sulfonic acid, 3-(N-methyl-amino)-8-naphthol-6-sulfonic acid, 1-(3'-amino- or 1-(3'-acetylamino-6'-sulfophenyl)-3-methyl- or -3-carboxy-5-pyrazolone, 2- (N-methyl-N-acetylamino)- or 2-methylamino-5-naphthol-7-sulfonic acid, N-methyl-aniline and N-propyl-m-toluidine.

If diazo components of the formula $H_2N$—D—$NH_2$ or $H_2N$—$D_1$—$NH_2$ are used as starting substances, these can also be employed in the form of the monoacylamino-amino compounds, in which the acyl radical is, in particular, the acetyl radical. These monoacylamino-amino compounds are first diazotized and coupled with a compound which is capable of coupling; the acyl radical is then split off by hydrolysis, and the amino group which has now become free again can be bonded with the fiber-reactive radical $Z^1$. Such monoacylated diamines are, for example, 2-sulfo-5-acetylamino-aniline and 2-sulfo-4-acetylamino-aniline. Coupling components containing an amino group can be employed in the coupling reaction in the form of the acylamino derivative in the same manner, in which case the acyl radical also can subsequently be split off by hydrolysis here, in order to bond the amino group liberated with the fiber-reactive group $Z^1$.

Bivalent coupling components which can serve to build up disazo dyestuffs according to the invention in which the bivalent coupling radical is bonded with two diazo components, one of which contains a fiber-reactive radical $R^G$ and the other of which contains a fiber-reactive radical Z, for example dyestuffs of the formulae (4c) and (4d), are, for example, resorcinol, 1,3-diamino-benzene, 5,5'-dihydroxy-7,7'-disulfo-2,2'-dinaphthylurea, 1,8-dihydroxy-3,6-disulfo-naphthalene and, in particular, 1-amino-8-naphthol-3,6-disulfonic acid and 1-amino-8-naphthol-4,6-disulfonic acid.

The dyestuffs of the formula (1) according to the invention are suitable for dyeing and printing the most diverse materials, such as silk, leather, wool, polyamide fibers and polyurethanes, and in particular all types of cellulose-containing fiber materials. Such fiber materials are, for example, the naturally occurring cellulose fibers, such as cotton, linen and hemp, as well as cellulose and regenerated cellulose. The dyestuffs of the formula (1) are also suitable for dyeing or printing fibers which contain hydroxy groups and are contained in blended fabrics, for example mixtures of cotton with polyester fibers or polyamide fibers.

The dyestuffs according to the invention can be applied to the fiber material and fixed on the fiber in various ways, for example in the form of aqueous dyestuff solutions and printing pastes. They are suitable both for the exhaustion process and for dyeing by the pad-dyeing process, in which the goods are impregnated with aqueous dyestuff solutions, if appropriate containing salts, and, after treatment with an alkali or in the presence of alkali, the dyestuff is fixed, if appropriate under the action of heat. The dyestuffs according to the invention are particularly suitable for the so-called cold pad-batch process, in which the dyestuff is applied on the padder together with the alkali, and is then fixed by storage at room temperature for several hours. After the fixing, the dyeings or prints are rinsed thoroughly with cold and hot water, if appropriate with addition of an agent which has a dispersing action and promotes diffusion of the non-fixed portions. These dyeing and printing processes are described in numerous instances in the general technical literature and also in the patent literature.

The present invention therefore also relates to the use of the dyestuffs of the formula (1) according to the invention for dyeing (including printing) these materials, and to processes for dyeing (and printing) such materials by a procedure which is customary per se, in which a dyestuff of the formula (1) is employed as the coloring agent, by applying the dyestuff of the formula (1) to the material in an aqueous medium and fixing it on the material by means of heat or by means of a compound having an alkaline action or by means of both.

If anthraquinone dyestuffs according to the invention have an inadequate solubility in the alkaline dye liquor, this deficiency can be eliminated in the manner known from the literature, by addition of dispersing agents or other non-colored compounds, for example a naphthalene-sulfonic acid/formaldehyde condensate or, in particular, anthraquinone-2-sulfonic acid.

The dyestuffs of the formula (1) are distinguished by a high reactivity, good fixing capacity and a very good build-up capacity. They can therefore be employed in the exhaustion dyeing process at low dyeing temperatures, and require only short steaming times in the pad-steam process. The degrees of fixing are high, and the non-fixed portions can easily be washed out, the difference between the degree of exhaustion and degree of fixing being remarkably small, that is to say the soaping loss is very low. The dyestuffs of the formula (1) are also particularly suitable for printing, above all on cotton, but likewise also for printing fibers containing nitrogen, for example wool or silk, or blended fabrics containing wool or silk. They are furthermore particularly suitable for use in the discharge printing and resist printing processes.

The dyeings and prints produced with the dyestuffs according to the invention have, in particular on cellulose fiber materials, a good depth of color and a high fiber/dyestuff bond stability, both in the acid and in the alkaline range, and furthermore a good light-fastness and very good wet-fastness properties, such as fastnesses to washing, water, seawater, cross-dyeing and perspiration, as well as a good fastness to pleating, fastness to ironing and fastness to rubbing.

The following Examples serve to illustrate the invention. The parts are parts by weight and the percentage data are percentages by weight, unless noted otherwise. Parts by weight bear the same relation to parts by volume as the kilogram to the liter.

The compounds described by their formulae in these Examples are given in the form of the free acid; in general, they are prepared and isolated in the form of their alkali metal salts, such as lithium, sodium or potassium salts, and are used for dyeing in the form of their salts. The starting compounds and components mentioned in the form of the free acid in the following Examples, in particular the Tabular Examples, can likewise be employed in the synthesis as such a form of their salts, preferably alkali metal salts.

The absorption maxima ($\lambda_{max}$) in the visible range stated for the dyestuffs according to the invention were determined with the aid of their alkali metal salts in aqueous solution. In the Tabular Examples, the $\lambda_{max}$ values are in parentheses where the color shade is stated; the wavelengths stated are in nm.

EXAMPLE A-1

146 parts of ethyl acetoacetate are added to a suspension of 184 parts of cyanuric chloride in 2000 parts of ice-water, and the reaction is carried out at 0° C. to 5° C. while maintaining a pH of 8 to 9 by addition of about 800 parts by volume of aqueous 2N sodium hydroxide solution. The synthesis solution is then clarified, 132 parts of 3-sulfo-aniline are added, and the reaction is carried out about 15° C. and at a pH of between 4 and 5. A solution of the compound of the formula

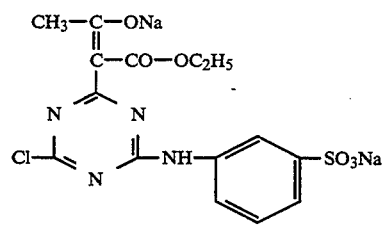

is obtained and, as described below, can be employed in the synthesis of dyestuffs according to the invention (the methyl ester and isopropyl ester derivatives and derivatives with other amino compounds can be prepared in an analogous manner by reacting cyanuric chloride with the equivalent amount of methyl acetoacetate or isopropyl acetoacetate and the corresponding amine, such as, for example, another aniline-sulfonic or -carboxylic acid, ammonia or taurine, in a procedure analogous to that described above).

EXAMPLE A-2

30.6 parts of acetylacetone are added to a suspension of 55 parts of cyanuric chloride in 600 parts of water at 0° C. The reaction is carried out at a pH of between 8 and 8.5, which is maintained by means of an aqueous 2N sodium hydroxide solution. The synthesis solution is then clarified, and 39.5 parts of 3-sulfo-aniline are added; the reaction is carried out at about 15° C. and at a pH of between 4 and 5. A solution of the compound of the formula

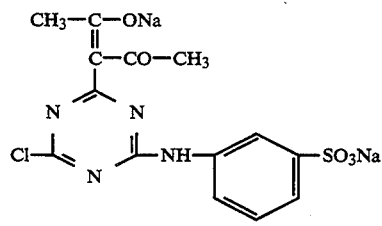

is obtained, and can be employed directly in the further synthesis steps for preparation of a dyestuff according to the invention (other amino derivatives can be prepared in an analogous manner by employing a different anilinesulfonic acid, an anilinecarboxylic acid, ammonia or taurine, as described above, after reaction of the cyanuric chloride with acetylacetone).

EXAMPLE A-3

223 parts of cyanuric chloride are introduced into a mixture of 103 parts of sodium bicarbonate and 800 parts of methanol at 20° C. The resulting precipitate of 2,4-dichloro-6-methoxy-s-triazine is filtered off after about one hour, sucked thoroughly dry and suspended in 1500 parts of water, 173 parts of aniline-3-sulfonic acid are added to this suspension, and second condensation reaction is carried out at a pH of between 4 and 5 and at a temperature of 15° to 20° C.

A solution of the compound of the formula

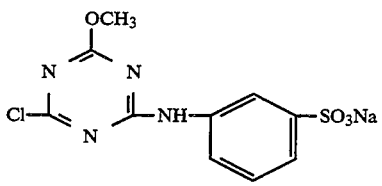

is obtained, and can be employed directly in the further synthesis steps for the preparation of a dyestuff according to the invention (other oxy derivatives can be prepared in an analogous manner by reacting cyanuric chloride with the equivalent amount of, for example, ethanol, β-hydroxypropionic acid or phenol and/or with another amine, such as another aniline-sulfonic or -carboxylic acid, diethylamine or tautins, by a procedure analogous to that described above).

EXAMPLE A-4

The compound 2,4-dichloro-6-methoxy-s-triazine is first prepared as described in Example A-3, and is isolated, dried and then dissolved in 1000 parts by volume of acetone, 152 parts of the monosodium salt of ethyl acetoacetate and 68 parts of sodium ethanolate are added, the mixture is further stirred at 15° to 25° C. for about 5 hours, the sodium chloride which has precipitated is filtered off, and the solution is evaporated.

The compound of the formula

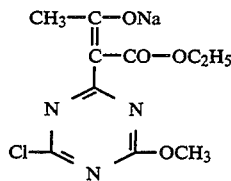

which can be employed in the synthesis of dyestuffs according to the invention, is obtained,

EXAMPLE A-5

The compound 2,4-dichloro-6-methoxy-s-triazine is first prepared as described in Example A-3 and is suspended in 1000 parts of water, 42 parts of cyanamide are added, and a temperature of about 20° C. and, by means of concentrated sodium hydroxide solution, a pH of between 8 and 9 are maintained during the reaction.

A suspension of the compound of the formula

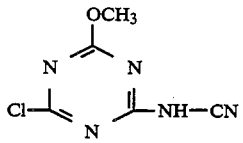

which can be employed for the synthesis of dyestuffs according to the invention, is obtained.

EXAMPLE A-6

134 parts of cyanuric chloride are suspended in 1000 parts of ice-water, 42 parts of cyanamide are added, and the reaction is carried out at a temperature of between 0° and 10° C. and at a pH of between 8 and 9. After about one hour, the mixture is warmed to 20° C., 73 parts of diethylamine are added, and the reaction is carried out at about 20° C. and at a pH of between 7 and 8. A suspension of the compound 2-chloro-4-cyanamido-6-diethylamino-s-triazine which is used as the starting compound for the synthesis of the dyestuffs according to the invention, is obtained.

EXAMPLE A-7

90 parts of sodium bicarbonate are added to the suspension of 2,4-dichloro-6-methoxy-s-triazine obtained according to Example A-3, and 73 parts of diethylamine are then added slowly, the reaction is carried out at about 15° to 20° C. for about 4 hours, the resulting synthesis solution is then evaporated. The compound 2-chloro-4-methoxy-6-diethylamino-s-triazine, which can be used for the synthesis of the dyestuffs according to the invention, is obtained.

EXAMPLE A-8

73 parts of diethylamine are added to the solution, obtained according to Example A-1, of the reaction product of cyanuric chloride and ethyl acetoacetate, and the second condensation reaction is carried out at a pH of between 7 and 8 and at a temperature of about 20° C. The compound of the formula

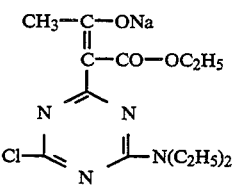

which can be employed for the synthesis of the dyestuffs according to the invention, is obtained.

EXAMPLE A-9

The 2,4-dichloro-6-methoxy-s-triazine obtained as described in Example A-3 is suspended in acetone, 46 parts of ethanol and 90 parts of sodium bicarbonate are slowly added, and the reaction is carried out at a temperature of between 40° and 50° C. for about one hour. The mixture is then evaporated to give the compound 2-chloro-4-methoxy-6-ethoxy-s-triazine as a powder which contains electrolyte salts and serves as the monochloro-triazine starting compound in the synthesis of dyestuffs according to the invention.

EXAMPLE A-10

78 parts of mercaptoethanol are added to a suspension of 184 parts of cyanuric chloride in 1500 parts of water at 0° C., and the reaction is carried out at about 0° to 5° C. for about 2 hours, while maintaining a pH of between 7 and 8 by means of sodium hydroxide solution. The temperature of the mixture is then increased to 20° C., 173 parts of aniline-3-sulfonic acid are added, and the reaction is carried out at about 20° C. and at a pH of between 4 and 5. The compound of the formula

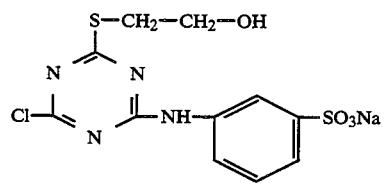

which can serve as a monochloro-triazine starting compound for the synthesis of dyestuffs according to the invention, is obtained.

EXAMPLE A-11

The 2,4-dichloro-6-methoxy-s-triazine obtained according to Example A-3 is suspended, with partial solution, in 1000 parts by volume of acetone, 110 parts of thiophenol and 90 parts of sodium bicarbonate are added, and the reaction is carried out at about 20° C. After about 2 hours, the synthesis mixture is evaporated. The compound 2-chloro-4-methoxy-6-phenylthio-s-triazine is obtained as a powder containing electrolyte salt. It serves as a monochloro-triazine starting compound for the synthesis of dyestuffs according to the invention.

EXAMPLE A-12

106 parts of β-mercapto-propionic acid are added to a suspension of 184 parts of cyanuric chloride in 1500 parts of water, and the reaction is carried out at 0° C., while maintaining a pH of between 8 and 9 by means of concentrated sodium hydroxide solution. After a reaction time of about 2 hours, the mixture is warmed to 20° C., 61 parts of ethanolamine are added, and the reaction is carried out at this temperature and at a pH of between 7 and 8. A suspension of the compound of the formula

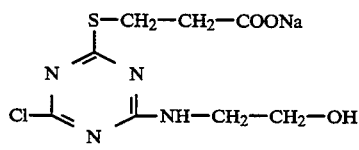

which can be employed directly for the synthesis of the dyestuffs according to the invention, is obtained.

EXAMPLE A-13

184 parts of cyanuric chloride are reacted with 146 parts of ethyl acetoacetate and then, at a pH of between 7 and 9 and at a temperature of about 20° C., with 85 parts of β-mercapto-propionic acid, as described in Example A-1. A solution of the monochloro-s-triazine starting compound of the formula

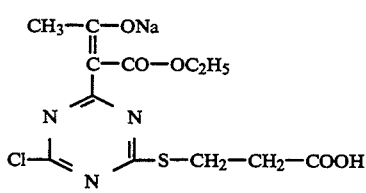

which, directly in the form of this solution or after isolation by evaporation of the solution, can serve for the synthesis of the dyestuffs according to the invention, is obtained.

EXAMPLE A-14

Cyanuric chloride is reacted with β-mercapto-propionic acid as described in Example A-12, 78 parts of β-mercapto-ethanol are then added, and the second condensation reaction is carried out at a temperature of about 20° C. and at a pH of between 8 and 9, which is maintained by addition of sodium hydroxide solution. The compound of the formula

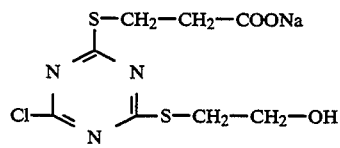

which can serve as a starting compound for the synthesis of dyestuffs according to the invention, is obtained.

EXAMPLE A-15

Cyanuric chloride is reacted with ethyl acetoacetate as described in Example A-1, 34 parts of cyanamide are added to the resulting suspension, the mixture is warmed to 20° C., and the reaction of the cyanamide with the dichlorotriazine compound is carried out at a pH of between 8 and 9. The compound of the formula

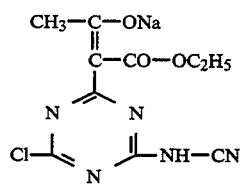

which can serve as a starting compound for the synthesis of dyestuffs according to the invention, is obtained.

EXAMPLE 1

346 parts of 3,6-disulfo-1-amino-8-naphthol are added to the solution, obtained according to Example A-3, of the compound 2-chloro-4-methoxy-6-(3'-sulfophenyl)-amino-s-triazine and the reaction is carried out at a temperature of about 60° C. and at a pH of about 3, which is maintained by means of concentrated sodium hydroxide solution, for about 3 hours. The hydrochloric acid-aqueous suspension of the diazonium salt, obtained by the customary route, of 250.5 parts of 4-(β-sulfatoethylsulfonyl)-aniline is added to the coupling component thus prepared, and the coupling reaction is carried out at 0° to 10° C. and at a pH of between 4 and 5.

The azo dyestuff according to the invention is isolated as the sodium salt by salting out by means of sodium chloride. It has, written in the form of the free acid, the formula

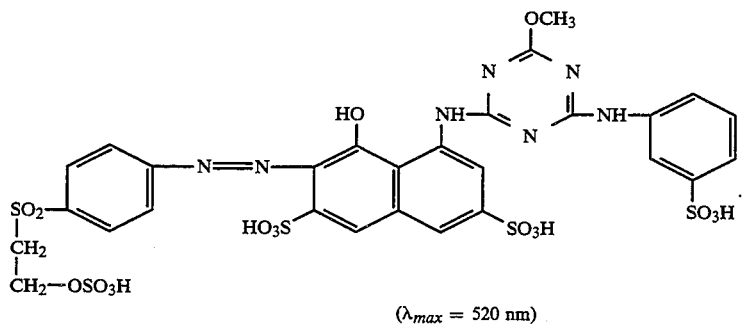

($\lambda_{max}$ = 520 nm)

It exhibits very good fiber-reactive dyestuff properties and produces deep, fast, red dyeings and prints by the dyeing and printing processes for fiber-reactive dyestuffs customary in the art.

EXAMPLE 2

17.35 parts of aniline-3-sulfonic acid are added to a suspension of 18.5 parts of cyanuric chloride in 200 parts of ice-water. The reaction is carried out at a pH of between 1.5 and 2 and at a temperature of about 0° C. in the course of about 2 hours. Thereafter, 8.8 parts of morpholine are added, and the second condensation reaction is carried out at a pH of between 6 and 6.5 and at a temperature of between 0° and 5° C. for about 3 hours. 30.5 parts of 1-amino-8-hydroxy-naphthalene-3,6-disulfonic acid are then added; the third condensation reaction is carried out at about 80° C. and at a pH of between 3 and 3.5 for about 3 hours.

An aqueous, hydrochloric acid diazonium salt solution, prepared by the customary route, of 28.35 parts of 4-(β-sulfatoethylsulfonyl)-aniline is added to the coupling component thus prepared; the coupling reaction is carried out at a pH of 4 to 5 and at a temperature of between 10° and 20° C.

The azo dyestuff according to the invention is isolated in the customary manner, for example by salting out with sodium chloride. It has, written in the form of the free acid, the formula The monoazo dyestuff according to the invention has very good fiber-reactive dyestuff properties and dyes the materials mentioned in the description, such as, in particular, cellulose fiber materials, in deep, fast red shades.

EXAMPLE 3

34.65 parts of aniline-3-sulfonic acid are added to a suspension of 36.8 parts of cyanuric chloride in 400 parts of ice-water, and the reaction is carried out at a pH of between 1.5 and 2 and at a temperature of about 0° C. for about 2 hours. 21.5 parts of diethanolamine are then added, and the second condensation reaction is carried out at a temperature of between 10° and 20° C., while maintaining a pH of 7 to 8 by means of concentrated sodium hydroxide solution. The third condensation reaction is carried out with 57.4 parts of 1-amino-8-hydroxy-naphthalene-3,6-disulfonic acid at a temperature of about 60° C. and at a pH of between 2 and 2.5 for about 2 hours.

The equivalent amount of the diazonium salt of 4-(β-sulfatoethylsulfonyl)-aniline is added, by a procedure analogous to that in Example 2, to the coupling component thus obtained, and the coupling reaction and the isolation of the resulting monoazo dyestuff according to the invention are carried out as described in Example 2.

The monoazo dyestuff according to the invention, of the formula (in the form of the free acid)

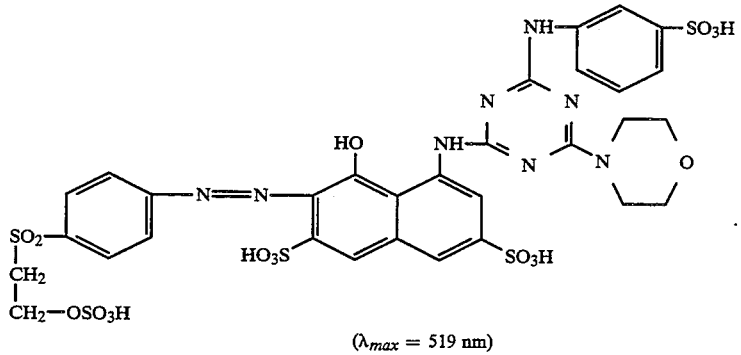

($\lambda_{max}$ = 519 nm)

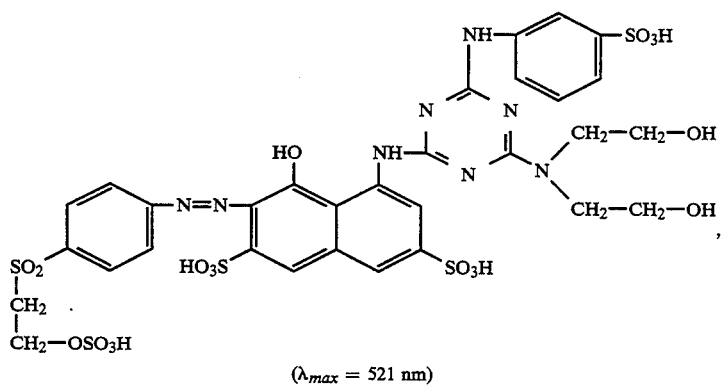

($\lambda_{max}$ = 521 nm)

with which deep, fast, red dyeings and prints are obtained, is obtained.

EXAMPLES 4 to 128

Further azo dyestuffs according to the invention are described in the following Tabular Examples with the aid of the components corresponding to the formula (A)

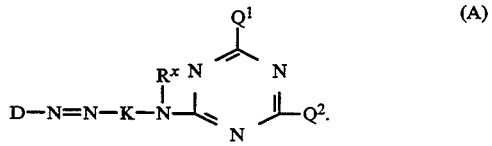

(A)

They can be prepared in the manner according to the invention, for example analogously to one of the above Examples, employing the components which can be seen from the particular Tabular Example in association with formula (A) (such as the diazo component D—NH$_2$, the coupling component H—K—NR$^x$H, a halogenotriazine, a compound of the formula H—Q$^1$ and a compound of the formula H—Q$^2$). They have very good fiber-reactive dyestuff properties and dye the material mentioned in the description, in particular cellulose fiber materials, such as cotton, in the shades stated in the particular Tabular Example (cotton here) in a good depth of color and with good fastness properties.

| Example | Radical D— | Radical —K—N(R$^x$)— | Radical —Q$^1$ | Radical —Q$^2$ | Color shade |
|---|---|---|---|---|---|
| 4 | 4-(β-Sulfatoethyl-sulfonyl)-phenyl | 8-Hydroxy-3,6-disulfo-7,1-naphthylene-1-amino | (Ethoxycarbonyl)-(acetyl)-methyl | 4-Sulfo-phenylamino | red (515) |
| 5 | 4-(β-Sulfatoethyl-sulfonyl)-phenyl | 8-Hydroxy-3,6-disulfo-7,1-naphthylene-1-amino | Cyanamido | Diethylamino | red (521) |
| 6 | 4-(β-Sulfatoethyl-sulfonyl)-phenyl | 8-Hydroxy-3,6-disulfo-7,1-naphthylene-1-amino | Methoxy | Diethylamino | red (518) |
| 7 | 4-(β-Sulfatoethyl-sulfonyl)-phenyl | 8-Hydroxy-3,6-disulfo-7,1-naphthylene-1-amino | Methoxy | Ethoxy | red (509) |
| 8 | 4-(β-Sulfatoethyl-sulfonyl)-phenyl | 8-Hydroxy-3,6-disulfo-7,1-naphthylene-1-amino | β-Hydroxyethyl-thio | 3-Sulfo-phenylamino | red (514) |
| 9 | 4-(β-Sulfatoethyl-sulfonyl)-phenyl | 8-Hydroxy-3,6-disulfo-7,1-naphthylene-1-amino | Methoxy | Thiol | red (512) |
| 10 | 4-(β-Sulfatoethyl-sulfonyl)-phenyl | 8-Hydroxy-3,6-disulfo-7,1-naphthylene-1-amino | (Ethoxycarbonyl)-(acetyl)-methyl | β-Carboxyethyl-thio | red |
| 11 | 6-(β-Sulfatoethylsulfonyl)-1-sulfo-naphth-2-yl | 8-Hydroxy-3,6-disulfo-7,1-naphthylene-1-amino | Methoxy | 2-Sulfo-phenylamino | red (531) |
| 12 | 6-(β-Sulfatoethylsulfonyl)-1-sulfo-naphth-2-yl | 8-Hydroxy-3,6-disulfo-7,1-naphthylene-1-amino | (Ethoxycarbonyl)-(acetyl)-methyl | β-Methoxy-ethoxy | red (535) |
| 13 | 6-(β-Sulfatoethylsulfonyl)-1-sulfo-naphth-2-yl | 8-Hydroxy-3,6-disulfo-7,1-naphthylene-1-amino | Cyanamido | Ethoxy | red (534) |
| 14 | 6-(β-Sulfatoethylsulfonyl)-1-sulfo-naphth-2-yl | 8-Hydroxy-3,6-disulfo-7,1-naphthylene-1-amino | β-Hydroxyethyl-thio | β-Sulfoethyl-amino | red |
| 15 | 6-(β-Sulfatoethylsulfonyl)-1-sulfo-naphth-2-yl | 8-Hydroxy-3,6-disulfo-7,1-naphthylene-1-amino | β-Carboxyethyl-thio | β-Hydroxyethyl-amino | red |
| 16 | 4-(β-Sulfatoethylsulfonyl)-2-sulfo-phenyl | 8-Hydroxy-3,6-disulfo-7,1-naphthylene-1-amino | (Ethoxycarbonyl)-(acetyl)-methyl | Methoxy | red (507) |
| 17 | 4-(β-Sulfatoethylsulfonyl)-2-sulfo-phenyl | 8-Hydroxy-3,6-disulfo-7,1-naphthylene-1-amino | Cyanamido | Methoxy | red (506) |
| 18 | 4-(β-Sulfatoethylsulfonyl)-2-sulfo-phenyl | 8-Hydroxy-3,6-disulfo-7,1-naphthylene-1-amino | Cyanamido | β-Hydroxyethyl-amino | red (511) |
| 19 | 4-(β-Sulfatoethylsulfonyl)-2-sulfo-phenyl | 8-Hydroxy-3,6-disulfo-7,1-naphthylene-1-amino | β-Carboxy-ethoxy | Diethylamino | red |
| 20 | 4-(β-Sulfatoethylsulfonyl)-2-sulfo-phenyl | 8-Hydroxy-3,6-disulfo-7,1-naphthylene-1-amino | β-Hydroxyethyl-thio | 2-Sulfo-phenylamino | red |
| 21 | 2,5-Dimethoxy-4-(β-sulfatoethylsulfonyl)-phenyl | 8-Hydroxy-3,6-disulfo-7,1-naphthylene-1-amino | (Ethoxycarbonyl)-(acetyl)-methyl | 3-Sulfo-phenylamino | claret (535) |
| 22 | 2,5-Dimethoxy-4-(β-sulfatoethylsulfonyl)-phenyl | 8-Hydroxy-3,6-disulfo-7,1-naphthylene-1-amino | Methoxy | 2-Sulfo-phenylamino | claret (532) |
| 23 | 2,5-Dimethoxy-4-(β-sulfatoethylsulfonyl)-phenyl | 8-Hydroxy-3,6-disulfo-7,1-naphthylene-1-amino | Cyanamido | Methoxy | claret (533) |

-continued

| Example | Radical D— | Radical —K—N(R$^x$)— | Radical —Q$^1$ | Radical —Q$^2$ | Color shade |
|---|---|---|---|---|---|
| 24 | 2,5-Dimethoxy-4-(β-sulfatoethylsulfonyl)-phenyl | 8-Hydroxy-3,6-disulfo-7,1-naphthylene-1-amino | Methoxy | Dimethylamino | claret (533) |
| 25 | 2,5-Dimethoxy-4-(β-sulfatoethylsulfonyl)-phenyl | 8-Hydroxy-3,6-disulfo-7,1-naphthylene-1-amino | Methoxy | Methoxy | claret |
| 26 | 2,5-Dimethoxy-4-(β-sulfatoethylsulfonyl)-phenyl | 8-Hydroxy-3,6-disulfo-7,1-naphthylene-1-amino | β-Hydroxyethyl-thio | 2-Carboxy-phenylamino | claret |
| 27 | 4-(β-Sulfatoethylsulfonyl)-phenyl | 8-Hydroxy-4,6-disulfo-7,1-naphthylene-1-amino | (Ethoxycarbonyl)-(acetyl)-methyl | 4-Sulfo-phenylamino | red |
| 28 | 4-(β-Sulfatoethylsulfonyl)-phenyl | 8-Hydroxy-4,6-disulfo-7,1-naphthylene-1-amino | (Ethoxycarbonyl)-(acetyl)-methyl | Methoxy | red |
| 29 | 4-(β-Sulfatoethylsulfonyl)-phenyl | 8-Hydroxy-4,6-disulfo-7,1-naphthylene-1-amino | β-Hydroxyethyl-thio | 3-Sulfo-phenylamino | red |
| 30 | 4-(β-Sulfatoethylsulfonyl)-phenyl | 8-Hydroxy-4,6-disulfo-7,1-naphthylene-1-amino | Methoxy | Thiol | red |
| 31 | 6-(β-Sulfatoethylsulfonyl)-1-sulfo-naphth-2-yl | 8-Hydroxy-4,6-disulfo-7,1-naphthylene-1-amino | (Ethoxycarbonyl)-(acetyl)-methyl | 3-Sulfo-phenylamino | red |
| 32 | 6-(β-Sulfatoethylsulfonyl)-1-sulfo-naphth-2-yl | 8-Hydroxy-4,6-disulfo-7,1-naphthylene-1-amino | Methoxy | 3-Sulfo-phenylamino | red |
| 33 | 6-(β-Sulfatoethylsulfonyl)-1-sulfo-naphth-2-yl | 8-Hydroxy-4,6-disulfo-7,1-naphthylene-1-amino | (Ethoxycarbonyl)-(acetyl)-methyl | Ethoxy | red |
| 34 | 6-(β-Sulfatoethylsulfonyl)-1-sulfo-naphth-2-yl | 8-Hydroxy-4,6-disulfo-7,1-naphthylene-1-amino | 3-Sulfo-phenylamino | 1-Carboxy-ethyl-1-amino | red |
| 35 | 6-(β-Sulfatoethylsulfonyl)-1-sulfo-naphth-2-yl | 8-Hydroxy-4,6-disulfo-7,1-naphthylene-1-amino | 3-Carboxy-phenylamino | 4-Sulfo-phenylamino | red |
| 36 | 6-(β-Sulfatoethylsulfonyl)-1-sulfo-naphth-2-yl | 8-Hydroxy-4,6-disulfo-7,1-naphthylene-1-amino | β-Methoxy-ethoxy | Ethoxy | red |
| 37 | 6-(β-Sulfatoethylsulfonyl)-1-sulfo-naphth-2-yl | 8-Hydroxy-4,6-disulfo-7,1-naphthylene-1-amino | (Ethoxycarbonyl)-(acetyl)-methyl | β-Carboxyethyl-thio | red |
| 38 | 2-Methoxy-5-methyl-4-(β-sulfatoethylsulfonyl)-phenyl | 8-Hydroxy-4,6-disulfo-7,1-naphthylene-1-amino | Methoxy | 2-Sulfo-phenylamino | red |
| 39 | 2-Methoxy-5-methyl-4-(β-sulfatoethylsulfonyl)-phenyl | 8-Hydroxy-4,6-disulfo-7,1-naphthylene-1-amino | (Ethoxycarbonyl)-(acetyl)-methyl | Methoxy | red |
| 40 | 2-Methoxy-5-methyl-4-(β-sulfatoethylsulfonyl)-phenyl | 8-Hydroxy-4,6-disulfo-7,1-naphthylene-1-amino | Cyanamido | Diethylamino | red |
| 41 | 2-Methoxy-5-methyl-4-(β-sulfatoethylsulfonyl)-phenyl | 8-Hydroxy-4,6-disulfo-7,1-naphthylene-1-amino | β-Carboxy-ethoxy | Diethylamino | red |
| 42 | 2-Methoxy-5-methyl-4-(β-sulfatoethylsulfonyl)-phenyl | 8-Hydroxy-4,6-disulfo-7,1-naphthylene-1-amino | Methoxy | Methoxy | red |
| 43 | 2-Methoxy-5-methyl-4-(β-sulfatoethylsulfonyl)-phenyl | 8-Hydroxy-4,6-disulfo-7,1-naphthylene-1-amino | Methoxy | Ethylthio | red |
| 44 | 4-(β-Sulfatoethylsulfonyl)-phenyl | 8-Hydroxy-6-sulfo-7,3-naphthylene-3-amino | (Ethoxycarbonyl)-(acetyl)-methyl | 3-Carboxy-phenylamino | orange (474) |
| 45 | 4-(β-Sulfatoethylsulfonyl)-phenyl | 8-Hydroxy-6-sulfo-7,3-naphthylene-3-amino | Methoxy | β-Sulfo-ethylamino | orange (472) |
| 46 | 4-(β-Sulfatoethylsulfonyl)-phenyl | 8-Hydroxy-6-sulfo-7,3-naphthylene-3-amino | (Ethoxycarbonyl)-(acetyl)-methyl | Methoxy | orange (474) |
| 47 | 4-(β-Sulfatoethylsulfonyl)-phenyl | 8-Hydroxy-6-sulfo-7,3-naphthylene-3-amino | Cyanamido | Methoxy | orange (470) |
| 48 | 4-(β-Sulfatoethylsulfonyl)-phenyl | 8-Hydroxy-6-sulfo-7,3-naphthylene-3-amino | Methoxy | Ethoxy | orange (472) |
| 49 | 4-(β-Sulfatoethylsulfonyl)-phenyl | 8-Hydroxy-6-sulfo-7,3-naphthylene-3-amino | β-Hydroxyethyl-thio | 3-Sulfo-phenylamino | orange |
| 50 | 4-(β-Sulfatoethylsulfonyl)-phenyl | 8-Hydroxy-6-sulfo-7,3-naphthylene-3-amino | 4-Carboxy-phenylthio | 3-Sulfo-phenylamino | orange |
| 51 | 4-(β-Sulfatoethylsulfonyl)-phenyl | 8-Hydroxy-6-sulfo-7,3-naphthylene-3-amino | (Ethoxycarbonyl)-(acetyl)-methyl | β-Carboxyethyl-thio | orange |
| 52 | 4-(β-Sulfatoethylsulfonyl)-phenyl | 8-Hydroxy-6-sulfo-7,2-naphthylene-2-amino | (Ethoxycarbonyl)-(acetyl)-methyl | 3-Carboxy-phenylamino | red-orange |
| 53 | 4-(β-Sulfatoethylsulfonyl)-phenyl | 8-Hydroxy-6-sulfo-7,2-naphthylene-2-amino | Cyanamido | β-Methoxy-ethoxy | red-orange |
| 54 | 4-(β-Sulfatoethylsulfonyl)-phenyl | 8-Hydroxy-6-sulfo-7,2-naphthylene-2-amino | Methoxy | β-Methoxy-ethoxy | red-orange |
| 55 | 4-(β-Sulfatoethylsulfonyl)-phenyl | 8-Hydroxy-6-sulfo-7,2-naphthylene-2-amino | Cyanamido | Methoxy | red-orange |
| 56 | 4-(β-Sulfatoethylsulfonyl)-phenyl | 8-Hydroxy-6-sulfo-7,2-naphthylene-2-amino | 3-Carboxy-phenylamino | 4-Sulfo-phenylamino | red-orange |
| 57 | 4-(β-Sulfatoethylsulfonyl)-phenyl | 8-Hydroxy-6-sulfo-7,2-naphthylene-2-amino | Methoxy | Ethoxy | red-orange |
| 58 | 4-(β-Sulfatoethylsulfonyl)-phenyl | 8-Hydroxy-6-sulfo-7,2-naphthylene-2-amino | β-Hydroxyethyl-thio | 3-Sulfo-phenylamino | red-orange |
| 59 | 6-(β-Sulfatoethylsulfonyl)-1-sulfo-naphth-2-yl | 8-Hydroxy-6-sulfo-7,2-naphthylene-2-amino | (Ethoxycarbonyl)-(acetyl)-methyl | 3-Carboxy-phenylamino | red-orange |
| 60 | 6-(β-Sulfatoethylsulfonyl)-1-sulfo-naphth-2-yl | 8-Hydroxy-6-sulfo-7,2-naphthylene-2-amino | Methoxy | 3-Sulfo-phenylamino | red-orange |
| 61 | 6-(β-Sulfatoethylsulfonyl)-1-sulfo-naphth-2-yl | 8-Hydroxy-6-sulfo-7,2-naphthylene-2-amino | 3-Carboxy-phenylamino | 4-Sulfo-phenylamino | red-orange |
| 62 | 6-(β-Sulfatoethylsulfonyl)-1-sulfo-naphth-2-yl | 8-Hydroxy-6-sulfo-7,2-naphthylene-2-amino | Methoxy | Ethoxy | red-orange |
| 63 | 6-(β-Sulfatoethylsulfonyl)-1-sulfo-naphth-2-yl | 8-Hydroxy-6-sulfo-7,2-naphthylene-2-amino | β-Hydroxyethyl-thio | 2-Sulfo-phenylamino | red-orange |
| 64 | 4-(β-Sulfatoethylsulfonyl)- | 8-Hydroxy-6-sulfo-7,2- | Methoxy | 3-Sulfo-phenylamino | orange |

-continued

| Example | Radical D— | Radical —K—N(R$^x$)— | Radical —Q$^1$ | Radical —Q$^2$ | Color shade |
|---|---|---|---|---|---|
| | 2-sulfo-phenyl | naphthylene-2-amino | | | |
| 65 | 4-(β-Sulfatoethylsulfonyl)-2-sulfo-phenyl | 8-Hydroxy-6-sulfo-7,2-naphthylene-2-amino | Cyanamido | Methoxy | orange |
| 66 | 4-(β-Sulfatoethylsulfonyl)-2-sulfo-phenyl | 8-Hydroxy-6-sulfo-7,2-naphthylene-2-amino | Methoxy | Ethoxy | orange |
| 67 | 4-(β-Sulfatoethylsulfonyl)-2-sulfo-phenyl | 8-Hydroxy-6-sulfo-7,2-naphthylene-2-amino | β-Hydroxyethyl-thio | 2-Sulfo-phenylamino | orange |
| 68 | 2,5-Dimethoxy-4-(β-sulfatoethylsulfonyl)-phenyl | 8-Hydroxy-6-sulfo-7,2-naphthylene-2-amino | Cyanamido | β-Methoxy-ethoxy | orange |
| 69 | 2,5-Dimethoxy-4-(β-sulfatoethylsulfonyl)-phenyl | 8-Hydroxy-6-sulfo-7,2-naphthylene-2-amino | Methoxy | Ethoxy | orange |
| 70 | 2,5-Dimethoxy-4-(β-sulfatoethylsulfonyl)-phenyl | 8-Hydroxy-6-sulfo-7,2-naphthylene-2-amino | β-Hydroxyethyl-thio | 2-Sulfo-phenylamino | orange |
| 71 | 6-(β-Sulfatoethylsulfonyl)-1-sulfo-naphth-2-yl | 8-Hydroxy-6-sulfo-7,3-naphthylene-3-amino | (Ethoxycarbonyl)-(acetyl)-methyl | 3-Carboxy-phenylamino | orange (479) |
| 72 | 6-(β-Sulfatoethylsulfonyl)-1-sulfo-naphth-2-yl | 8-Hydroxy-6-sulfo-7,3-naphthylene-3-amino | (Ethoxycarbonyl)-(acetyl)-methyl | Methoxy | orange (475) |
| 73 | 6-(β-Sulfatoethylsulfonyl)-1-sulfo-naphth-2-yl | 8-Hydroxy-6-sulfo-7,3-naphthylene-3-amino | Cyanamido | β-Methoxy-ethoxy | orange (480) |
| 74 | 6-(β-Sulfatoethylsulfonyl)-1-sulfo-naphth-2-yl | 8-Hydroxy-6-sulfo-7,3-naphthylene-3-amino | 3-Sulfo-phenylamino | 1-Carboxy-ethyl-1-amino | orange (485) |
| 75 | 6-(β-Sulfatoethylsulfonyl)-1-sulfo-naphth-2-yl | 8-Hydroxy-6-sulfo-7,3-naphthylene-3-amino | β-Hydroxyethyl-thio | 2-Sulfo-phenylamino | orange |
| 76 | 6-(β-Sulfatoethylsulfonyl)-1-sulfo-naphth-2-yl | 8-Hydroxy-6-sulfo-7,3-naphthylene-3-amino | 4-Carboxy-phenylthio | 3-Sulfo-phenylamino | orange |
| 77 | 3-(β-Sulfatoethylsulfonyl)-phenyl | 8-Hydroxy-6-sulfo-7,3-naphthylene-3-amino | (Ethoxycarbonyl)-(acetyl)-methyl | 3-Sulfo-phenylamino | orange |
| 78 | 3-(β-Sulfatoethylsulfonyl)-phenyl | 8-Hydroxy-6-sulfo-7,3-naphthylene-3-amino | Methoxy | β-Sulfo-ethylamino | orange |
| 79 | 3-(β-Sulfatoethylsulfonyl)-phenyl | 8-Hydroxy-6-sulfo-7,3-naphthylene-3-amino | Cyanamido | Diethylamino | orange |
| 80 | 3-(β-Sulfatoethylsulfonyl)-phenyl | 8-Hydroxy-6-sulfo-7,3-naphthylene-3-amino | Methoxy | Phenylamino | orange |
| 81 | 3-(β-Sulfatoethylsulfonyl)-phenyl | 8-Hydroxy-6-sulfo-7,3-naphthylene-3-amino | 3-Carboxy-phenylamino | 4-Sulfo-phenylamino | orange |
| 82 | 6-(β-Sulfatoethylsulfonyl)-1-sulfo-naphth-2-yl | 8-Hydroxy-4,6-disulfo-7,1-naphthylene-1-amino | β-Hydroxyethyl-thio | 3-Sulfo-phenylamino | red |
| 83 | 2,5-Dimethoxy-4-(β-sulfatoethylsulfonyl)-phenyl | 8-Hydroxy-4,6-disulfo-7,1-naphthylene-1-amino | (Ethoxycarbonyl)-(acetyl)-methyl | 4-Sulfo-phenylamino | red |
| 84 | 2,5-Dimethoxy-4-(β-sulfatoethylsulfonyl)-phenyl | 8-Hydroxy-4,6-disulfo-7,1-naphthylene-1-amino | (ethoxycarbonyl)-(acetyl)-methyl | Ethoxy | red |
| 85 | 2,5-Dimethoxy-4-(β-sulfatoethylsulfonyl)-phenyl | 8-Hydroxy-4,6-disulfo-7,1-naphthylene-1-amino | Cyanamido | Ethoxy | red |
| 86 | 2,5-Dimethoxy-4-(β-sulfatoethylsulfonyl)-phenyl | 8-Hydroxy-4,6-disulfo-7,1-naphthylene-1-amino | Cyanamido | β-Hydroxyethyl-amino | red |
| 87 | 2,5-Dimethoxy-4-(β-sulfatoethylsulfonyl)-phenyl | 8-Hydroxy-4,6-disulfo-7,1-naphthylene-1-amino | Methoxy | Methoxy | red |
| 88 | 8-(β-Sulftoethylsulfonyl)-6-sulfo-naphth-2-yl | 8-Hydroxy-4,6-disulfo-7,1-naphthylene-1-amino | (Ethoxycarbonyl)-(acetyl)-methyl | 3-Sulfo-phenylamino | red |
| 89 | 8-(β-Sulftoethylsulfonyl)-6-sulfo-naphth-2-yl | 8-Hydroxy-4,6-disulfo-7,1-naphthylene-1-amino | (Ethoxycarbonyl)-(acetyl)-methyl | Methoxy | red |
| 90 | 8-(β-Sulftoethylsulfonyl)-6-sulfo-naphth-2-yl | 8-Hydroxy-4,6-disulfo-7,1-naphthylene-1-amino | Cyanamido | Methoxy | red |
| 91 | 8-(β-Sulftoethylsulfonyl)-6-sulfo-naphth-2-yl | 8-Hydroxy-4,6-disulfo-7,1-naphthylene-1-amino | Cyanamido | Phenylamino | red |
| 92 | 8-(β-Sulftoethylsulfonyl)-6-sulfo-naphth-2-yl | 8-Hydroxy-4,6-disulfo-7,1-naphthylene-1-amino | 3-Carboxy-phenylamino | 4-Sulfo-phenylamino | red |
| 93 | 8-(β-Sulftoethylsulfonyl)-6-sulfo-naphth-2-yl | 8-Hydroxy-4,6-disulfo-7,1-naphthylene-1-amino | Methoxy | Ethoxy | red |
| 94 | 8-(β-Sulftoethylsulfonyl)-6-sulfo-naphth-2-yl | 8-Hydroxy-4,6-disulfo-7,1-naphthylene-1-amino | 4-Carboxy-phenylthio | Diethylamino | red |
| 95 | 4-(β-Sulfatoethylsulfonyl)-phenyl | 3-Sulfo-6,1-phenylene-1-amino | Methoxy | 2-Sulfo-phenylamino | golden yellow (413) |
| 96 | 4-(β-Sulfatoethylsulfonyl)-phenyl | 3-Sulfo-6,1-phenylene-1-amino | (Ethoxycarbonyl)-(acetyl)-methyl | 3-Sulfo-phenylamino | golden yellow (417) |
| 97 | 4-(β-Sulfatoethylsulfonyl)-phenyl | 3-Sulfo-6,1-phenylene-1-amino | (Ethoxycarbonyl)-(acetyl)-methyl | 4-Sulfo-phenylamino | golden yellow (417) |
| 98 | 4-(β-Sulfatoethylsulfonyl)-phenyl | 3-Sulfo-6,1-phenylene-1-amino | Methoxy | Ethoxy | golden yellow (412) |
| 99 | 4-(β-Sulfatoethylsulfonyl)-phenyl | 3-Sulfo-6,1-phenylene-1-amino | β-Hydroxyethyl-thio | 3-Sulfo-phenylamino | golden yellow |
| 100 | 2,5-Dimethoxy-4-(β-sulfatoethylsulfonyl)-phenyl | 3-Sulfo-6,1-phenylene-1-amino | Ethoxy | 3-Sulfo-phenylamino | orange |
| 101 | 2,5-Dimethoxy-4-(β-sulfatoethylsulfonyl)-phenyl | 3-Sulfo-6,1-phenylene-1-amino | Cyanamido | Methoxy | orange |
| 102 | 2,5-Dimethoxy-4-(β-sulfatoethylsulfonyl)-phenyl | 3-Sulfo-6,1-phenylene-1-amino | 3-Sulfo-phenylamino | 3-Carboxy-phenylamino | orange |

-continued

| Example | Radical D— | Radical —K—N(R$^x$)— | Radical —Q$^1$ | Radical —Q$^2$ | Color shade |
|---|---|---|---|---|---|
| 103 | 4-(β-Sulfatoethylsulfonyl)-2-sulfo-phenyl | 3-Sulfo-6,1-phenylene-1-amino | Cyanamido | Hydrazino | golden yellow |
| 104 | 4-(β-Sulfatoethylsulfonyl)-2-sulfo-phenyl | 3-Sulfo-6,1-phenylene-1-amino | Methoxy | Methoxy | golden yellow |
| 105 | 4-(β-Sulfatoethyl-sulfonyl)-phenyl | 8-Hydroxy-3,6-disulfo-7,1-naphthylene-1-amino | 4-Sulfo-phenylamino | N-Morpholino | red (519) |
| 106 | 4-(β-Sulfatoethyl-sulfonyl)-phenyl | 8-Hydroxy-3,6-disulfo-7,1-naphthylene-1-amino | 4-Sulfo-phenylamino | N-(β-Hydroxyethyl)-amino | red (520) |
| 107 | 4-(β-Sulfatoethyl-sulfonyl)-phenyl | 8-Hydroxy-3,6-disulfo-7,1-naphthylene-1-amino | 4-Sulfo-phenylamino | N,N-Di-(β-hydroxyethyl)-amino | red (521) |
| 108 | 4-(β-Sulfatoethyl-sulfonyl)-phenyl | 8-Hydroxy-3,6-disulfo-7,1-naphthylene-1-amino | Cyanamido | β-Methoxy-ethoxy | red (519) |
| 109 | 4-(β-Sulfatoethyl-sulfonyl)-phenyl | 8-Hydroxy-3,6-disulfo-7,1-naphthylene-1-amino | Cyanamido | Diethylamino | red (521) |
| 110 | 4-(β-Sulfatoethyl-sulfonyl)-phenyl | 8-Hydroxy-3,6-disulfo-7,1-naphthylene-1-amino | 3-Sulfo-phenylamino | N-(β-Hydroxyethyl)-amino | red (518) |
| 111 | 4-(β-Sulfatoethyl-sulfonyl)-phenyl | 8-Hydroxy-3,6-disulfo-7,1-naphthylene-1-amino | 3-Sulfo-phenylamino | Amino | red (517) |
| 112 | 4-(β-Sulfatoethyl-sulfonyl)-phenyl | 8-Hydroxy-3,6-disulfo-7,1-naphthylene-1-amino | 4-Sulfo-phenylamino | Amino | red (518) |
| 113 | 6-(β-Sulfatoethylsulfonyl)-1-sulfo-naphth-2-yl | 8-Hydroxy-3,6-disulfo-7,1-naphthylene-1-amino | 4-Sulfo-phenylamino | Amino | bluish-tinged red (538) |
| 114 | 6-(β-Sulfatoethylsulfonyl)-1-sulfo-naphth-2-yl | 8-Hydroxy-3,6-disulfo-7,1-naphthylene-1-amino | 4-Sulfo-phenylamino | N-(β-Hydroxyethyl)-amino | bluish-tinged red (539) |
| 115 | 6-(β-Sulfatoethylsulfonyl)-1-sulfo-naphth-2-yl | 8-Hydroxy-3,6-disulfo-7,1-naphthylene-1-amino | 4-Sulfo-phenylamino | N-Morpholino | bluish-tinged red (540) |
| 116 | 6-(β-Sulfatoethylsulfonyl)-1-sulfo-naphth-2-yl | 8-Hydroxy-3,6-disulfo-7,1-naphthylene-1-amino | 4-Sulfo-phenylamino | N,N-Di-(β-hydroxyethyl)-amino | bluish-tinged red (538) |
| 117 | 6-(β-Sulfatoethylsulfonyl)-1-sulfo-naphth-2-yl | 8-Hydroxy-3,6-disulfo-7,1-naphthylene-1-amino | 3-Sulfo-phenylamino | N-Morpholino | bluish-tinged red (537) |
| 118 | 6-(β-Sulfatoethylsulfonyl)-1-sulfo-naphth-2-yl | 8-Hydroxy-3,6-disulfo-7,1-naphthylene-1-amino | 3-Carboxy-phenylamino | N-Morpholino | bluish-tinged red (538) |
| 119 | 4-(β-Sulfatoethylsulfonyl)-phenyl | 8-Hydroxy-3,6-disulfo-7,1-naphthylene-1-amino | (Ethoxycarbonyl)-(acetyl)-methyl | Diethylamino | red (521) |
| 120 | 2,5-Dimethoxy-4-(β-sulfatoethylsulfonyl)-phenyl | 8-Hydroxy-3,6-disulfo-7,1-naphthylene-1-amino | (Ethoxycarbonyl)-(acetyl)-methyl | 3-Sulfo-phenylamino | claret (535) |
| 121 | 4-(β-Sulfatoethylsulfonyl)-phenyl | 8-Hydroxy-4,6-disulfo-7,1-naphthylene-1-amino | (Ethoxycarbonyl)-(acetyl)-methyl | 3-Sulfo-phehylamino | red |
| 122 | 6-(β-Sulfatoethylsulfonyl)-1-sulfo-naphth-2-yl | 8-Hydroxy-4,6-disulfo-7,1-naphthylene-1-amino | (Ethoxycarbonyl)-(acetyl)-methyl | 3-Sulfo-phenylamino | red |
| 123 | 6-(β-Sulfatoethylsulfonyl)-1-sulfo-naphth-2-yl | 8-Hydroxy-4,6-disulfo-7,1-naphthylene-1-amino | 3-Sulfo-phenylamino | 1-Carboxy-ethyl-1-amino | red |
| 124 | 6-(β-Sulfatoethylsulfonyl)-1-sulfo-naphth-2-yl | 8-Hydroxy-4,6-disulfo-7,1-naphthylene-1-amino | 3-Carboxy-phenylamino | 4-Sulfo-phenylamino | red |
| 125 | 4-(β-Sulfatoethylsulfonyl)-phenyl | 8-Hydroxy-6-sulfo-7,3-naphthylene-3-amino | (Ethoxycarbonyl)-(acetyl)-methyl | 3-Carboxy-phenylamino | orange |
| 126 | 4-(β-Sulfatoethylsulfonyl)-phenyl | 8-Hydroxy-6-sulfo-7,3-naphthylene-3-amino | 3-Carboxy-phenylamino | 3-Sulfo-phenylamino | red-orange |
| 127 | 6-(β-Sulfatoethylsulfonyl)-1-sulfo-naphth-2-yl | 8-Hydroxy-6-sulfo-7,3-naphthylene-3-amino | (Ethoxycarbonyl)-(acetyl)-methyl | 3-Carboxy-phenylamino | orange |
| 128 | 6-(β-Sulfatoethylsulfonyl)-1-sulfo-naphth-2-yl | 8-Hydroxy-6-sulfo-7,3-naphthylene-3-amino | 3-Sulfo-phenylamino | 1-Carboxy-ethyl-1-amino | orange |

EXAMPLE 129

180 parts of 1,3-diaminobenzene-4-sulfonic acid are slowly added to the solution, prepared according to Example A-3, of the compound 2-chloro-4-methoxy-6-(2'-sulfophenyl)-amino-s-triazine, the mixture is heated to 60° C., and the reaction is carried out at a pH of about 2.5. When the reaction has ended, a pH of 7 is established, the solution is cooled, 200 parts by volume of an aqueous 5N sodium nitrite solution are added, and the compound is diazotized by slow addition of this mixture containing sodium nitrite to a mixture of 500 parts by volume of concentrated hydrochloric acid and 600 parts of ice. The mixture is subsequently stirred for about a further 2 hours, excess nitrous acid is destroyed in the customary manner by means of amidosulfonic acid, and the resulting diazonium salt solution is then reacted with 60 parts of the azo compound 2-[4'-(β-sulfatoethylsulfonyl)-phenyl]-azo-1-amino-8-hydroxy-3,6-disulfonaphthalene, which serves as the coupling component, suspended in 250 parts of water, at a temperature of about 10° C. and at a pH of 5.5.

The disazo compound according to the invention is isolated by evaporation, or as the sodium salt by salting out with sodium chloride. It has, written in the form of the free acid, the formula

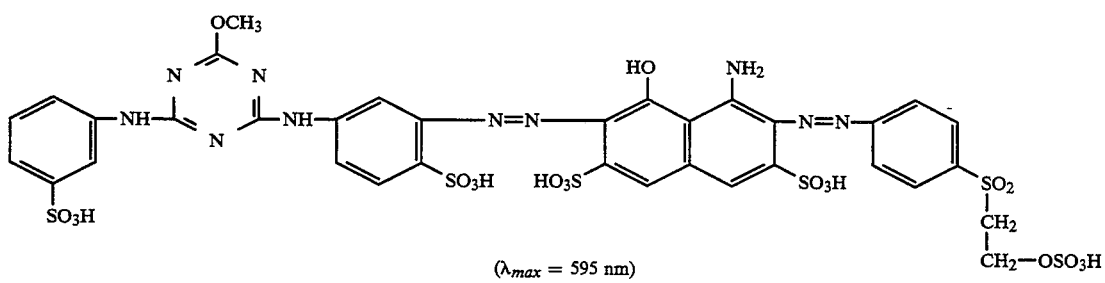

($\lambda_{max}$ = 595 nm)

and is distinguished by very good fiber-reactive dyestuff properties. Deep, navy blue dyeings and prints having good fastness properties are obtained on the materials mentioned in the description, in particular cellulose fiber materials, with the disazo dyestuff according to the invention by the procedures for fiber-reactive dyestuffs customary in the art.

EXAMPLE 130

To prepare an azo dyestuff according to the invention, the procedure is initially as described in Example 129, in order to prepare the diazonium salt of the reaction product of 2-chloro-4-methoxy-6-(3'-sulfophenyl)-amino-s-triazine and 1,3-diamino-4-sulfonic acid. The diazonium salt solution is combined with the aqueous solution of 1-[4'-($\beta$-sulfatoethylsulfonyl)-phenyl]-3-methyl-5-pyrazolone and the coupling reaction is carried out at a pH of between 5 and 6 and at a temperature of about 20° C.

The azo dyestuff according to the invention is isolated as the sodium salt by salting out with sodium chloride. It has, written in the form of the free acid, the formula

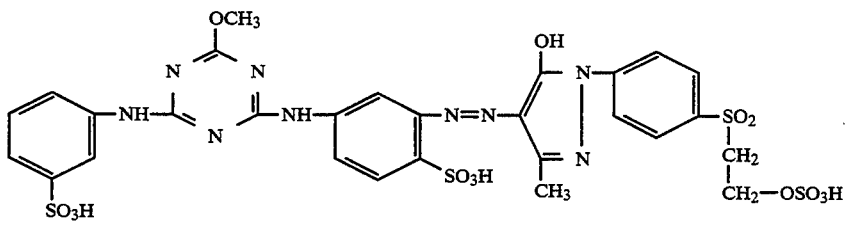

($\lambda_{max}$ = 383 nm)

exhibits very good fiber-reactive dyestuff properties and, for example, dyes cellulose fiber materials in fast, deep yellow shades.

We claim:
1. A dyestuff of the formula

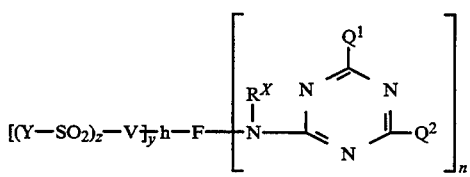

in which

F is the radical of a monoazo, disazo or polyazo dyestuff, or of a heavy metal complex azo dyestuff derived therefrom, or of an anthraquinone, phthalocyanine, formazan, azomethine, dioxazine, phenazine, stilbene, triphenylmethane, xanthene, thioxanthene, nitroaryl, naphthoquinone, pyrenequinone or perylenetetracarbimide dyestuff;

$R^x$ is hydrogen or alkyl of 1 to 4 carbon atoms unsubstituted or substituted by halogen, hydroxy, cyano, alkoxy of 1 to 4 carbon atoms, alkoxycarbonyl of 2 to 5 carbon atoms, carboxy, sulfamoyl, sulfo or sulfato;

n is the number 1 or 2;

V is a direct bond or an alkylene or an optionally substituted arylene, or is an alkylene-arylene or arylene-alkylene or alkylene-arylene-alkylene or arylene-alkylene-arylene, or is an arylene-arylene which is interrupted by a hetero group, and the alkylenes of these groups are those having 1 to 8 carbon atoms and are unsubstituted or substituted, and the arylenes of these groups are unsubstituted or substituted phenylenes or naphthylenes, and the alkylenes are not or are interrupted by one or more hetero groups and the alkylene and arylene moieties in the combined alkylenes-arylenes are not interrupted or are separated from one another by a hetero group;

y is the number 1 or 2;

z is the number 1 or 2;

h is an nitrogen atom, if y is 2, or, if y is 1, is a group of the formula —NH—, —N(R)—, where R has one of the abovementioned meanings, or is —NH—CO—NH—, —NH—CO— or —CO—NH—, or is a direct bond;

Y is vinyl, or is ethyl which contains, in the $\beta$-position, a substituent which is eliminated under alkaline conditions;

$Q^1$ is a group of the general formula (2A)

in which $W^R$ and $W^S$, together with the nitrogen atom, form a heterocyclic radical which is built up from an alkylene of 3 to 8 carbon atoms, or form a heterocyclic radical which is built up from a further hetero group selected from oxygen and a group of the formula —NH—, and two alkylenes of 1 to 4 carbon atoms;

$Q^2$ is phenylamino substituted by sulfo in the phenyl.

2. A dyestuff as claimed in claim 1 of the formula

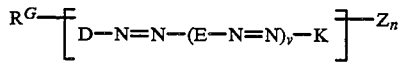

in which $R^G$ is a group of the formula

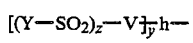

in which

Y, V, h, z and y have the meanings given in claim 1,

Z is a group of the formula

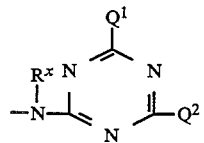

in which $R^x$, $Q^1$ and $Q^2$ are defined as in claim 1, and n is the number 1 or 2, Z is bonded to D or to K or, if n is 2, to D and K, and in which $R^G$ and Z are not simultaneously bonded to D and K, D is the radical of a diazo component to which a further azo radical can be bonded, E is the bivalent radical of a diazotizable compound which is capable of coupling, K is the radical of a coupling component to which a further azo radical can be bonded, and v is the number zero or 1.

3. A dyestuff as claimed in claim 1 of the formula

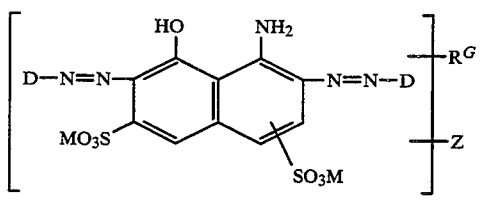

in which

D is each, independently of one another, the radical of a diazo component, to which a further azo radical can be bonded, $R^G$ is a group of the formula

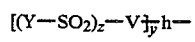

in which

Y, V, h, z and y have the meanings given in claim 1,

Z is a group of the formula

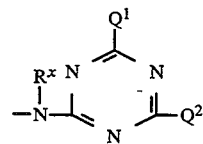

in which the $R^x$, $Q^1$ and $Q^2$ are defined as in claim 1, and

M is hydrogen or an alkali metal.

4. A dyestuff as claimed in claim 1 of the formula

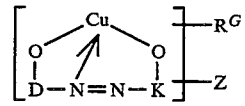

$R^G$ is a group of the formula

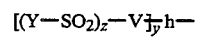

in which

Y, V, h, z and y have the meanings given in claim 1,

Z is a group of the formula

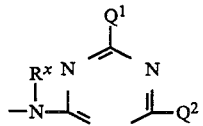

in which the $R^x$, $Q^1$ and $Q^2$ are defined as in claim 1, and

Z is bonded to D or K, $R^G$ and Z not simultaneously being bonded to D and K,

D is the radical of a diazo component, to which a further azo radical can be bonded, and K is the radical of a coupling component, to which a further azo radical can be bonded.

5. A dyestuff as claimed in claim 1, in which $R^x$ is methyl, ethyl or hydrogen.

6. A dyestuff as claimed in claim 1, in which n is 1.

7. A dyestuff as claimed in claim 1, in which V and h are each a direct bond.

8. A dyestuff as claimed in claim 1, in which

F is the radical of a monoazo, disazo or polyazo dyestuff, or of a heavy metal complex azo dyestuff derived therefrom, n is the number 1, y is the number 1, V and h are both a direct bond and the group(s) —$SO_2$—Y is (are) bonded to an aromatic carbon atom of F directly or via an alkylene having 1 to 4 carbon atoms or via an alkylamino group having 1 to 4 carbon atoms.

9. A dyestuff as claimed in claim 1 of the formula

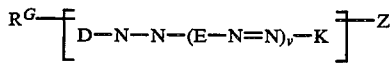

in which $R^G$ is bonded to D and Z is bonded to K, or $R^G$ is bonded to K and Z is bonded to D, and $R^G$ is a group of the formula $(Y-SO_2)_z-$ where Y and Z have the meanings given in claim 1, Z is a radical of the formula

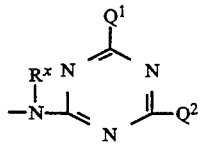

in which $R^x$, $Q^1$ and $Q^2$ have the meanings given in claim 1,

D is the radical of a diazo component, to which a further azo radical can be bonded, E is the bivalent radical of a diazotizable compound which is capable of coupling, K is the radical of a coupling component to which a further azo radical can be bonded and v is the number zero or 1.

10. A dyestuff as claimed in claim 1, in which $Q^1$ is morpholino.

11. A dyestuff as claimed in claim 1, in which $Q^2$ is monosulfo-phenylamino.

12. A dyestuff as claimed in claim 10, in which $Q^2$ is monosulfo-phenylamino.

* * * * *